(12) United States Patent
Kato et al.

(10) Patent No.: US 12,346,068 B2
(45) Date of Patent: Jul. 1, 2025

(54) STEPPING MOTOR CONTROL DEVICE, MOVEMENT, TIMEPIECE, AND STEPPING MOTOR CONTROL METHOD

(71) Applicant: SEIKO WATCH KABUSHIKI KAISHA (trading as SEIKO WATCH CORPORATION), Tokyo (JP)

(72) Inventors: Kazuo Kato, Chiba (JP); Tomohiro Ihashi, Chiba (JP); Kazumi Sakumoto, Chiba (JP); Akihito Okumura, Chiba (JP)

(73) Assignee: SEIKO WATCH KABUSHIKI KAISHA (TRADING AS SEIKO WATCH CORPORATION), Tokyo (JP)

( * ) Notice: Subject to any disclaimer, the term of this patent is extended or adjusted under 35 U.S.C. 154(b) by 758 days.

(21) Appl. No.: 17/688,530

(22) Filed: Mar. 7, 2022

(65) Prior Publication Data

US 2022/0291637 A1 Sep. 15, 2022

(30) Foreign Application Priority Data

Mar. 12, 2021 (JP) ................. 2021-040047

(51) Int. Cl.
| | |
|---|---|
| G04C 3/14 | (2006.01) |
| G04B 19/02 | (2006.01) |
| H02K 7/116 | (2006.01) |
| H02K 11/26 | (2016.01) |
| H02K 11/33 | (2016.01) |
| H02K 37/00 | (2006.01) |

(52) U.S. Cl.
CPC ............... *G04C 3/14* (2013.01); *H02K 7/116* (2013.01); *H02K 11/26* (2016.01); *H02K 11/33* (2016.01); *H02K 37/00* (2013.01); *G04B 19/02* (2013.01)

(58) Field of Classification Search
CPC .......... G04C 3/14; H02K 11/26; H02K 11/33; H02K 7/116; H02K 37/00; G04B 19/02
USPC .......................................................... 368/80
See application file for complete search history.

(56) References Cited

U.S. PATENT DOCUMENTS

| | | | |
|---|---|---|---|
| 2004/0184357 A1* | 9/2004 | Shen ..................... | G04C 3/008 368/220 |
| 2019/0219969 A1* | 7/2019 | Kawata ................. | G04B 19/02 |

(Continued)

FOREIGN PATENT DOCUMENTS

| | | | |
|---|---|---|---|
| JP | 2016003877 A | * | 1/2016 |
| JP | 2019124681 A | | 7/2019 |

*Primary Examiner* — Edwin A. Leon
*Assistant Examiner* — Kevin Andrew Johnston
(74) *Attorney, Agent, or Firm* — Crowell & Moring LLP

(57) ABSTRACT

A stepping motor control device configured to drive a stepping motor having a rotor and a coil includes: a train wheel including a load gear which has a load tooth whose rotation load is different from that of another tooth and in which the rotor has an odd number of rotation steps when the load gear rotates once, and transmitting a rotation force from the rotor to the hand; a voltage detection unit that detects an induced voltage generated at one end portion of a first end portion and a second end portion of the coil when the rotor vibrates; and a determination unit which, based on a result detected by the voltage detection unit, determines a mechanical load received by the rotor due to contact of the load tooth of the load gear with a tooth meshing with the load gear.

15 Claims, 17 Drawing Sheets

(56) References Cited

U.S. PATENT DOCUMENTS

2019/0273456 A1\* 9/2019 Okumura .................. H02P 8/02
2019/0286064 A1\* 9/2019 Yamamoto ............... G04C 3/14

\* cited by examiner

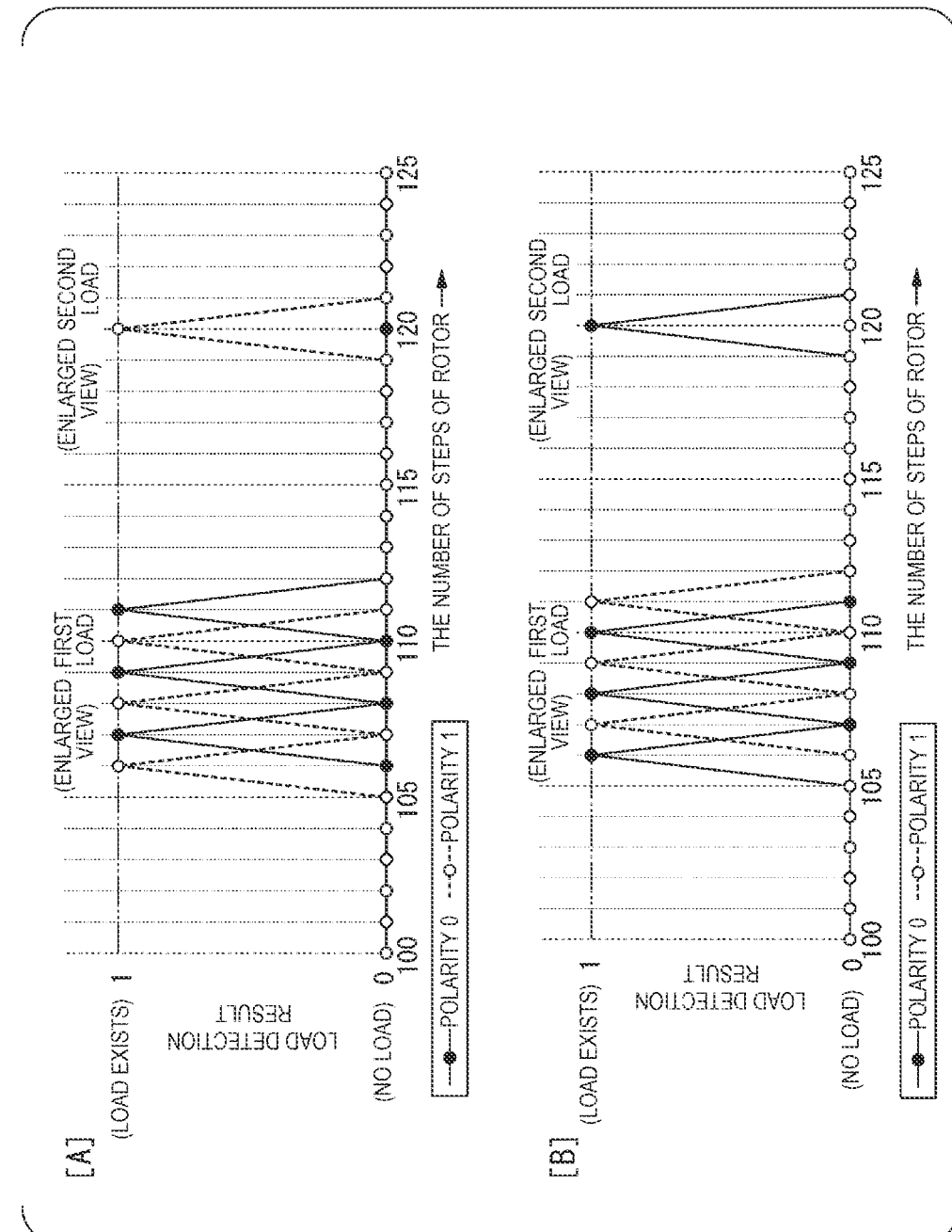

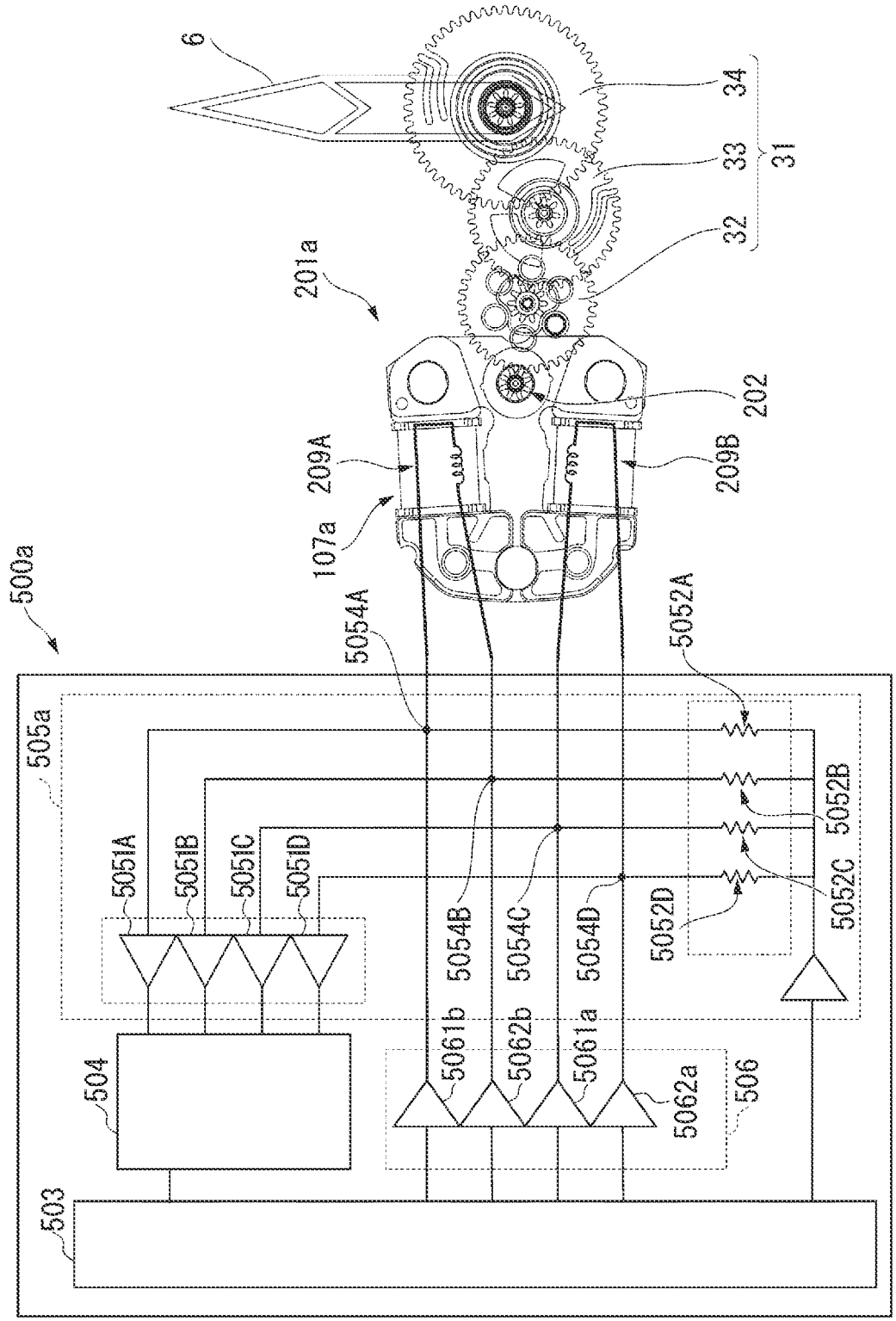

STEPPING MOTOR CONTROL DEVICE, MOVEMENT, TIMEPIECE, AND STEPPING MOTOR CONTROL METHOD

RELATED APPLICATIONS

This application claims priority to Japanese Patent Application No. 2021-040047, filed on Mar. 12, 2021, the entire content of which is incorporated herein by reference.

BACKGROUND OF THE INVENTION

1. Field of the Invention

The present invention relates to a stepping motor control device, a movement, a timepiece, and a stepping motor control method.

2. Description of the Related Art

In the related art, a technique is proposed for detecting a rotational position of the gear by detecting a change in a rotation load when making the gear having elastically deformable teeth rotate as a change in an induced voltage generated in a drive coil of a stepping motor (see, for example, JP-2019-124681 (PTL 1)).

The technique in the related art as described in PTL 1 has a problem that in order to accurately detect the change in the rotation load of the gear, a configuration of a detection circuit may be complicated.

SUMMARY OF THE INVENTION

The invention has been made in view of such a situation, and an object thereof is to simplify a configuration of a detection circuit for a hand position.

(1) A stepping motor control device according to an aspect of the invention includes: a drive unit that is a circuit configured to drive a stepping motor including a rotor making a hand rotate and coils generating a magnetic flux for making the rotor rotate and includes a first drive circuit configured to supply a first current flowing in a direction from a first end portion to a second end portion of the coils and a second drive circuit configured to supply a second current flowing in a direction from the second end portion to the first end portion; a control unit that outputs, to the drive unit, a drive pulse for making the rotor rotate stepwise every half rotation and a swing pulse for making the rotor swing; a train wheel that includes a load gear which has a load tooth whose rotation load is different from that of another tooth and in which the rotor has an odd number of rotation steps when the load gear rotates once, and transmits a rotation force from the rotor to the hand; a voltage detection unit that detects an induced voltage generated at one end portion of the first end portion and the second end portion of the coils when the rotor vibrates; and a determination unit that, based on a result detected by the voltage detection unit, determines a mechanical load received by the rotor due to contact of the load tooth of the load gear with a tooth meshing with the load gear.

(2) In the stepping motor control device according to the aspect of the invention, the train wheel includes a first wheel that rotates at an angular velocity matching an angular velocity of the hand, a second wheel that has a pinion meshing with a gear of the first wheel and has the load gear, and a third wheel that has a pinion meshing with the load gear of the second wheel and a gear meshing with the rotor.

(3) In the stepping motor control device according to the aspect of the invention, the rotor has an odd number of the rotation steps when the second wheel rotates once.

(4) In the stepping motor control device according to the aspect of the invention, the number of the teeth of the second wheel is an odd number.

(5) In the stepping motor control device according to the aspect of the invention, the gear of the first wheel has a load tooth whose rotation load is different from that of another tooth, and the determination unit respectively determines a first load which is a mechanical load received by the rotor due to the pinion of the second wheel in contact with the load tooth of the first wheel, and a second load which is a mechanical load received by the rotor due to contact of the pinion of the third wheel with the load tooth of the second wheel.

(6) In the stepping motor control device according to the aspect of the invention, the stepping motor includes the plurality of coils, and the drive unit includes a set of the first drive circuit and the second drive circuit corresponding to each of the plurality of coils.

(7) In the stepping motor control device according to the aspect of the invention, the determination unit determines a timing at which the induced voltage is required to be detected by interpolating a result detected by the voltage detection unit based on a detection cycle of the induced voltage detected in the past.

(8) A stepping motor control device according to an aspect of the invention includes: a drive unit including a circuit that drives a stepping motor including a rotor making a hand rotate and a coil generating a magnetic flux for making the rotor rotate; a control unit that outputs, to the drive unit, a drive pulse for making the rotor rotate and a swing pulse for making the rotor swing; a train wheel that includes a load gear which has a load tooth whose rotation load is different from that of another tooth, and transmits a rotation force from the rotor to the hand; a voltage detection unit that detects an induced voltage generated in the coil when the rotor vibrates; and a determination unit that, based on a result detected by the voltage detection unit, determines a mechanical load received by the rotor due to contact of the load tooth of the load gear with a tooth of another gear meshing with the load gear, and determines a timing at which the mechanical load is required to be detected by interpolating the result detected by the voltage detection unit based on a detection cycle of the mechanical load detected in the past.

(9) A movement according to an aspect of the invention includes the stepping motor control device described above and the stepping motor.

(10) A timepiece according to an aspect of the invention includes the movement described above.

(11) A stepping motor control method according to an aspect of the invention includes: outputting, to a drive unit, a drive pulse for making a rotor rotate stepwise every half rotation and a swing pulse for making the rotor swing, the drive unit being a circuit configured to drive a stepping motor including the rotor making a hand rotate and a coil generating a magnetic flux for making the rotor rotate and including a first drive circuit configured to supply a first current flowing in a direction from a first end portion to a second end portion of the coil and a second drive circuit configured to supply a second current flowing in a direction from the second end portion to the first end portion; detecting an induced voltage generated in the first end portion of the coil from induced voltages generated in the coil when the rotor vibrates; determining, based on a detection result of the induced voltage, a mechanical load received by the rotor due to contact of a load tooth of a load gear, among gears constituting a train wheel that transmits a rotational force from the rotor to the hand, with a tooth of another gear meshing with the load gear, the load tooth having a rotation load different from that of another tooth, the rotor having an odd number of rotation steps of the rotor when the load gear rotates once.

(12) A stepping motor control method according to an aspect of the invention includes: outputting, to a drive unit, a drive pulse for making a rotor rotate and a swing pulse for making the rotor swing, the drive unit including a circuit configured to drive a stepping motor including a rotor that makes a hand rotate and a coil that generates a magnetic flux for making the rotor rotate; detecting an induced voltage generated in the coil when the rotor vibrates; determining, based on a detection result of the induced voltage, a mechanical load received by the rotor due to contact of a load tooth of a load gear with a tooth of another gear meshing with the load gear; and determining a timing at which the mechanical load is required to be detected by interpolating the detection result of the induced voltage based on a detection cycle of the mechanical load detected in the past.

BRIEF DESCRIPTION OF THE DRAWINGS

FIG. 15 is a diagram showing an example of a relation between a method for assembling a rotor and the occurrence timing of the load fluctuation according to the comparative example.

FIG. 16 is a diagram showing an example of a specific configuration of a stepping motor control device in a case of a two-coil motor according to the comparative example.

DESCRIPTION OF EMBODIMENTS

Figure 1:
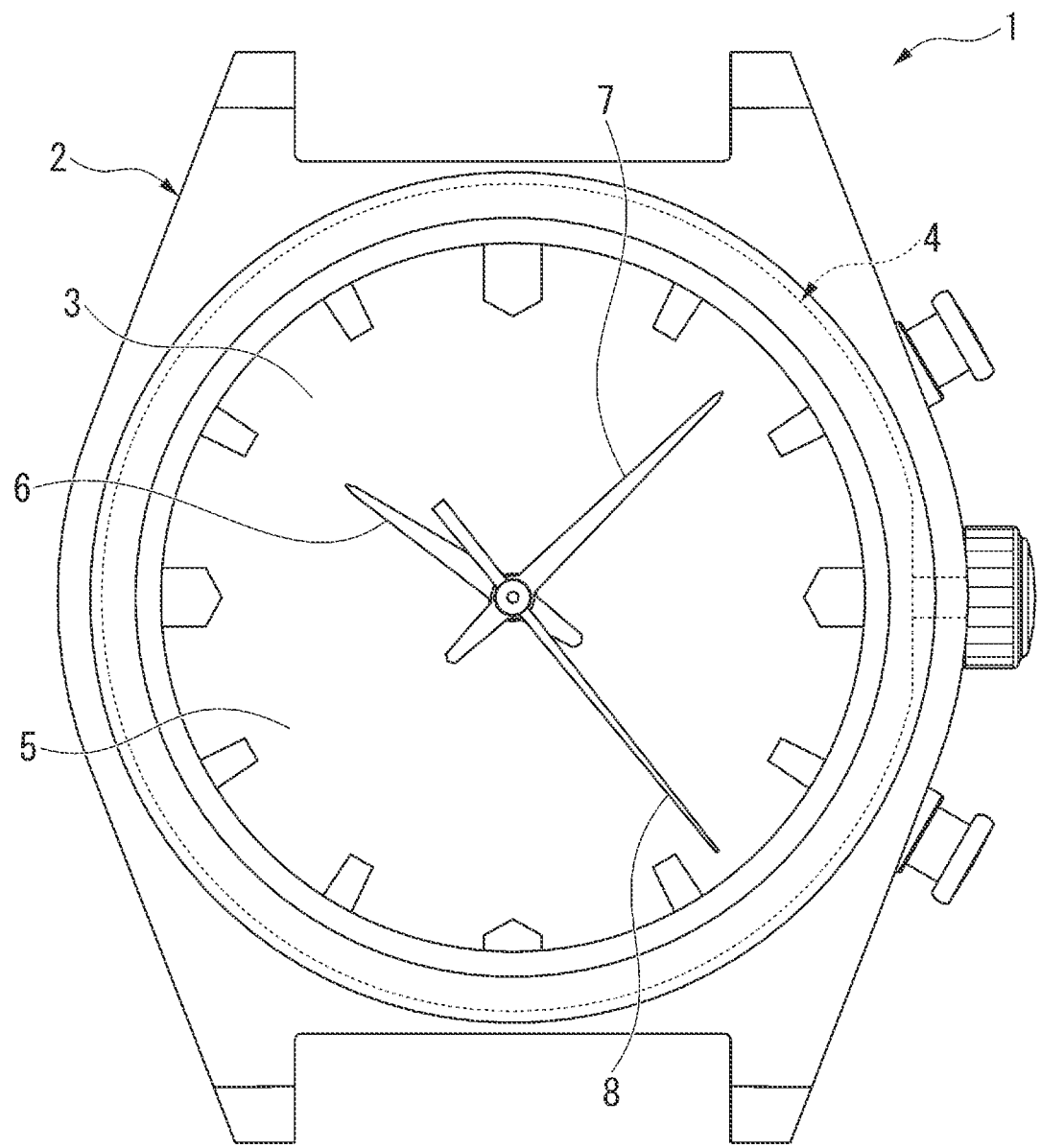
FIG. 1 is an external view of a timepiece according to a first embodiment.

Hereinafter, embodiments of the invention will be described with reference to the drawings. In the following description, configurations having the same or similar functions are denoted by the same reference numerals. Duplicate descriptions of those configurations may be omitted.

First Embodiment

First, an overview of a technique for detecting a rotational position of a gear by an induced voltage generated in a drive coil of a stepping motor will be described. Then, a technique for simplifying a circuit for detecting the induced voltage generated in the drive coil will be described.

[Rotational Position Detection of Gear]

In general, a mechanical body including a drive portion of a timepiece is referred to as a "movement". A state where a dial and hands are attached to the movement and put into a timepiece case to make a finished product is referred to as a "complete" of the timepiece. In both sides of a main plate that constitutes a board of the timepiece, the side where glass of the timepiece case is provided (that is, the side where the dial is provided) is called a "back side" of the movement. In the both sides of the main plate, the side where a case back of the timepiece case is provided (that is, the side opposite to the dial) is called a "front side" of the movement.

FIG. 1 is an external view of a timepiece according to a first embodiment.

As shown in FIG. 1, a complete of a timepiece 1 of the present embodiment includes, in a timepiece case 2 configured with a case back (not shown) and glass 3, a movement 4 (timepiece movement), a dial 5 having an indicator, an hour hand 6 (hand), a minute hand 7, and a second hand 8.

Figure 2:
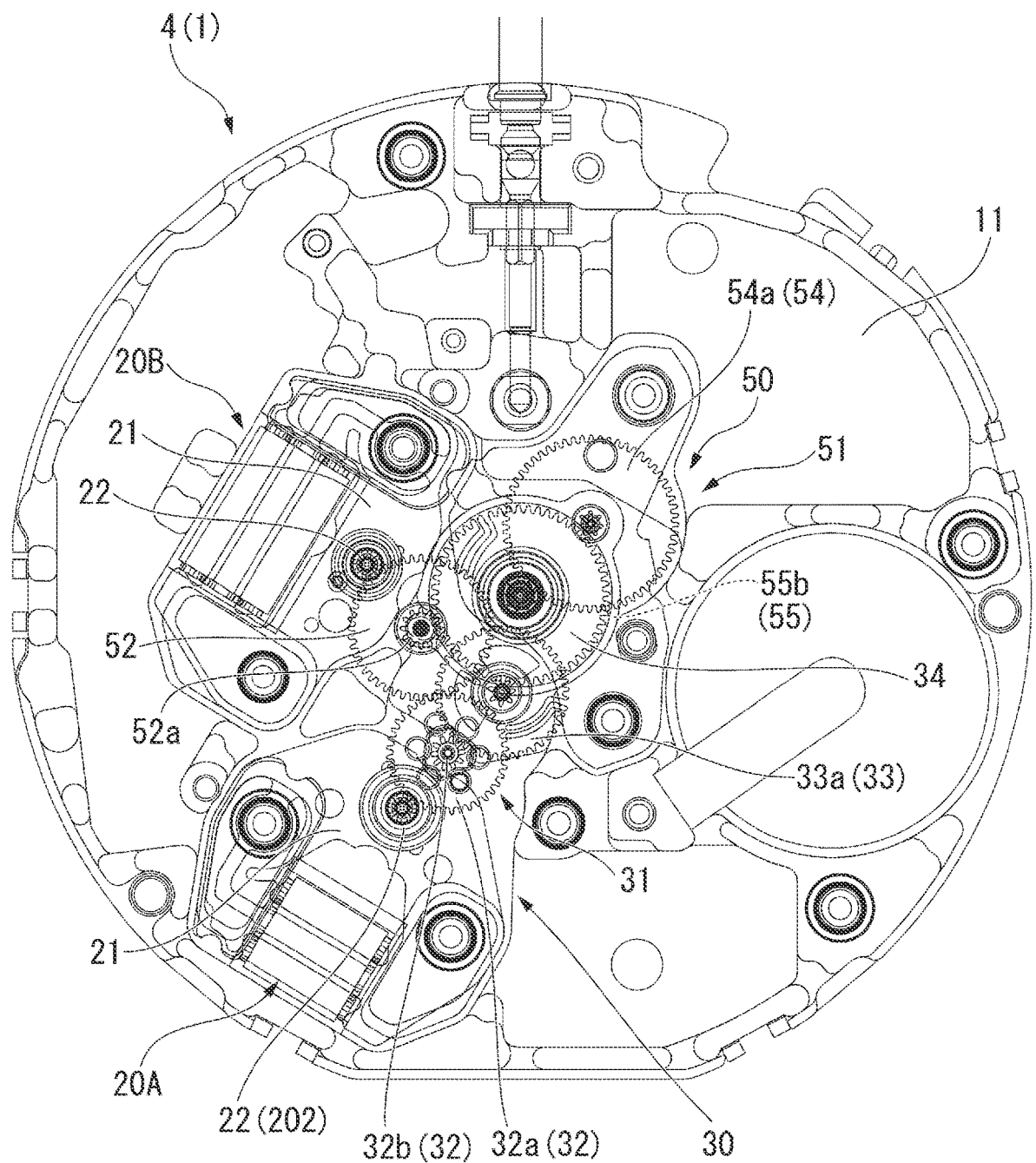
FIG. 2 is a plan view of a front side of a movement according to the first embodiment.

FIG. 2 is a plan view of a front side of the movement according to the first embodiment.

As shown in FIG. 2, the movement 4 includes a main plate 11, a first motor 20A, a second motor 20B, a first train wheel group 30, and a second train wheel group 50. The main plate 11 constitutes a board of the movement 4.

[Configuration of Train Wheel]

As shown in FIG. 2, the first motor 20A and the second motor 20B are stepping motors each including a stator 21 and a rotor 22. The first motor 20A and the second motor 20B make the rotors 22 rotate by 180 degrees in one step, respectively. The first motor 20A generates power to make the hour hand 6 rotate (see FIG. 1). The second motor 20B generates power to make the minute hand 7 and the second hand 8 rotate (both see FIG. 1). A pinion is formed on the rotor 22 of each of the first motor 20A and the second motor 20B.

The first train wheel group 30 includes a gear rotating based on a rotation of the rotor 22 of the first motor 20A. The first train wheel group 30 includes an hour train wheel 31 transmitting the rotation of the rotor 22 of the first motor 20A to the hour hand 6 (see FIG. 1).

When the timepiece 1 has a 24-hour hand or a calendar function, the first train wheel group 30 may include a calendar train wheel that transmits the rotation of the rotor 22 of the first motor 20A to the 24-hour hand or a date indicator of a calendar. A detailed description of the calendar train wheel is omitted.

The hour train wheel 31 includes a third wheel 32, a second wheel 33, and a first wheel 34.

The third wheel 32 is rotatably supported by the main plate 11 (see FIG. 2). The third wheel 32 includes a third wheel gear 32a and a third wheel pinion 32b. The third wheel gear 32a meshes with the pinion of the rotor 22 of the first motor 20A.

The second wheel 33 is rotatably supported by the main plate 11. The second wheel 33 includes a second wheel gear 33a and a second wheel pinion 33b. The second wheel gear 33a meshes with the third wheel pinion 32b of the third wheel 32. The second wheel 33 is a driven gear with respect to the third wheel 32.

The first wheel 34 is rotatably supported by the main plate 11. The first wheel 34 includes a first wheel gear 34a. The first wheel gear 34a meshes with the second wheel pinion 33b of the second wheel 33. The first wheel 34 is a driven gear with respect to the second wheel 33. The hour hand 6 (see FIG. 1) is attached to the first wheel 34.

As shown in FIG. 2, the second train wheel group 50 includes a gear rotating based on a rotation of the rotor 22 of the second motor 20B. The second train wheel group 50 includes a front train wheel 51 transmitting the rotation of the rotor 22 of the second motor 20B to the second hand 8 and the minute hand 7 (both see FIG. 1). The front train wheel 51 includes a first intermediate wheel 52, a second intermediate wheel 53, a third intermediate wheel 54, and a fourth intermediate wheel 55.

Details of the second train wheel group 50 are omitted.

[Configuration of Load Gear]

Figure 3:
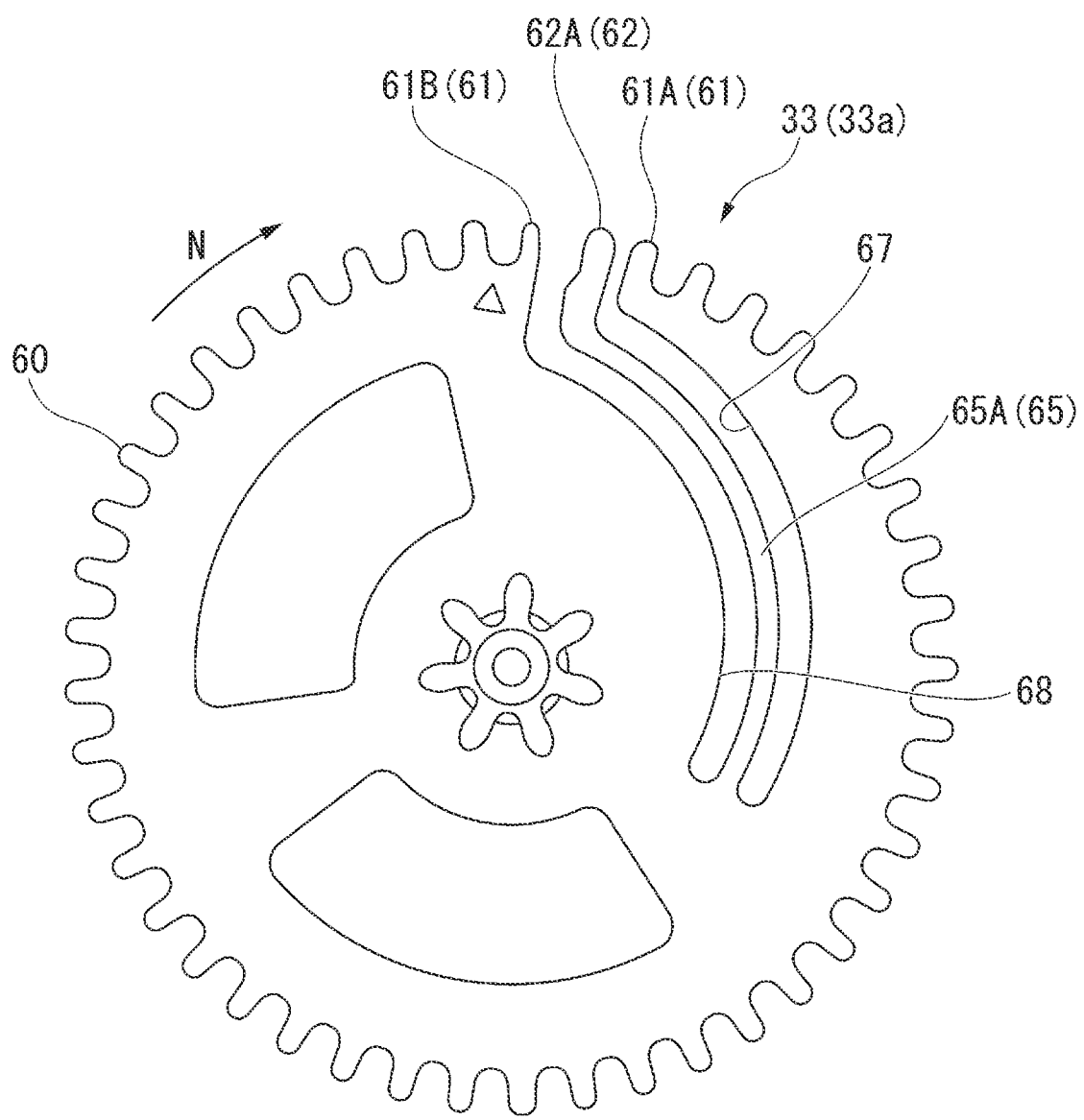
FIG. 3 is a diagram showing an example of a load gear according to the first embodiment.

FIG. 3 is a diagram showing an example of a load gear according to the first embodiment.

As shown in FIG. 3, the second wheel 33 includes a plurality of teeth 60 and an elastic portion 65.

The plurality of teeth 60 include standard teeth 61 and a first load tooth 62A as a load tooth 62. The standard teeth 61 are all of the plurality of teeth 60 except the first load tooth 62A. The standard teeth 61 are teeth of a general gear and are teeth formed in an arc tooth profile, an involute tooth profile, a cycloid tooth profile, or the like. The first load tooth 62A is one of the plurality of teeth 60 of the second wheel 33. The first load tooth 62A is disposed on one side of an outer circumference of the second wheel 33 so as not to come into contact with the third wheel pinion 32b at equal intervals when the second wheel 33 rotates. The first load tooth 62A is formed so as to be elastically displaceable by being supported by the elastic portion 65.

The elastic portion 65 is provided for each load tooth 62. The elastic portion 65 has the load tooth 62 at a tip and is a cantilever beam formed so as to be flexible and deformable. The elastic portion 65 includes a first elastic portion 65A having the first load tooth 62A. The first elastic portion 65A is a portion between a first slit 67 and a second slit 68 formed in the second wheel 33. The first slit 67 extends radially inward from a tooth groove on one side adjacent to the first load tooth 62A and then extends toward one side in the circumferential direction. The second slit 68 extends along the first slit 67 from a tooth groove on the other side adjacent to the first load tooth 62A. Accordingly, the first elastic portion 65A extends with a substantially constant width and is formed to be elastically deformable so as to displace the first load tooth 62A at the tip in the radial direction.

Here, among the plurality of standard teeth 61, a first standard tooth 61A and a second standard tooth 61B are defined as follows. The first standard tooth 61A is adjacent to the first load tooth 62A on a downstream side in a forward rotation direction N (a predetermined rotation direction) of the second wheel 33. The second standard tooth 61B is adjacent to the first load tooth 62A on an upstream side in the forward rotation direction N.

A distance between the first load tooth 62A and the first standard tooth 61A is narrower than a distance between the first load tooth 62A and the second standard tooth 61B. A width of a tooth groove between the first load tooth 62A and the first standard tooth 61A is smaller than a tooth thickness of a tooth of the third wheel pinion 32b. A width of a tooth groove between a pair of adjacent teeth 60 is a distance between a pair of teeth 60 on a pitch circle of the second wheel 33. A tooth thickness of the tooth 60 is a thickness of the tooth 60 on the pitch circle of the second wheel 33. Accordingly, when the teeth of the third wheel pinion 32b enter the tooth groove between the first load tooth 62A and the first standard tooth 61A, the teeth come into contact with the first load tooth 62A. A width of a tooth groove between the first load tooth 62A and the second standard tooth 61B is larger than the tooth thickness of the tooth of the third wheel pinion 32b. Accordingly, the teeth of the third wheel pinion 32b can enter the tooth groove between the first load tooth 62A and the second standard tooth 61B without coming into contact with the first load tooth 62A.

Here, an action of the load tooth 62 will be described. In the following description, it is assumed that the second wheel 33 rotates in the forward rotation direction N unless otherwise specified. Each of the teeth 60 of the second wheel 33 is in contact with the teeth of the third wheel pinion 32b from the upstream side in the forward rotation direction N.

When the teeth 60 engaged with the third wheel pinion 32b is replaced with the first standard tooth 61A, the teeth of the third wheel pinion 32b enter the tooth groove between the first standard tooth 61A and the first load tooth 62A. In this case, the teeth of the third wheel pinion 32b come into contact with the first load tooth 62A before and after coming into contact with the first standard tooth 61A, and elastically displaces the first load tooth 62A so as to widen the width of the tooth groove between the first standard tooth 61A and the first load tooth 62A. Accordingly, an energy loss due to an elastic displacement of the first load tooth 62A occurs in the hour train wheel 31. Then, when the teeth 60 engaged with the third wheel pinion 32b are replaced with the first load tooth 62A, the first load tooth 62A gradually returns to an initial position. When the teeth 60 engaged with the third wheel pinion 32b are replaced from the first load tooth 62A to the second standard tooth 61B, the teeth of the third wheel pinion 32b are completely separated from the first load tooth 62A in the tooth groove between the first load tooth 62A and the second standard tooth 61B, and the first load tooth 62A returns to the initial position.

Details of the meshing of the teeth of the pinion with the load tooth will be described later with reference to FIG. 7.

As described above, when the first load tooth 62A of the second wheel 33 comes into contact with the third wheel pinion 32b, the energy loss occurs in the hour train wheel 31. When the energy loss occurs in the hour train wheel 31, a load received by the rotor 22 of the first motor 20A fluctuates. Accordingly, the load tooth 62 can give a fluctuation to the load received by the rotor 22. Therefore, in a case where the first load tooth 62A of the second wheel 33 comes into contact with the third wheel pinion 32b, the load fluctuates only when the rotor 22 rotates in one step. The fluctuation of the load given by the load tooth 62 may be different from that of a load when the standard tooth 61 comes into contact with the third wheel pinion 32b. Hereinafter, the load received by the rotor 22 may be referred to as a rotation load.

The first wheel 34 has the same configuration as the second wheel 33. That is, the first wheel 34 includes standard teeth 61a (not shown) corresponding to the standard teeth 61 of the second wheel 33, and a load tooth 62a (not shown) corresponding to the standard tooth 62 of the second wheel 33.

That is, a gear of the first wheel 34 has a load tooth whose rotation load is different from that of other teeth.

In the following description, the second wheel 33 is also referred to as a second load gear, and the first wheel 34 is also referred to as a first load gear.

[Functional Configuration of Timepiece]

Figure 4:
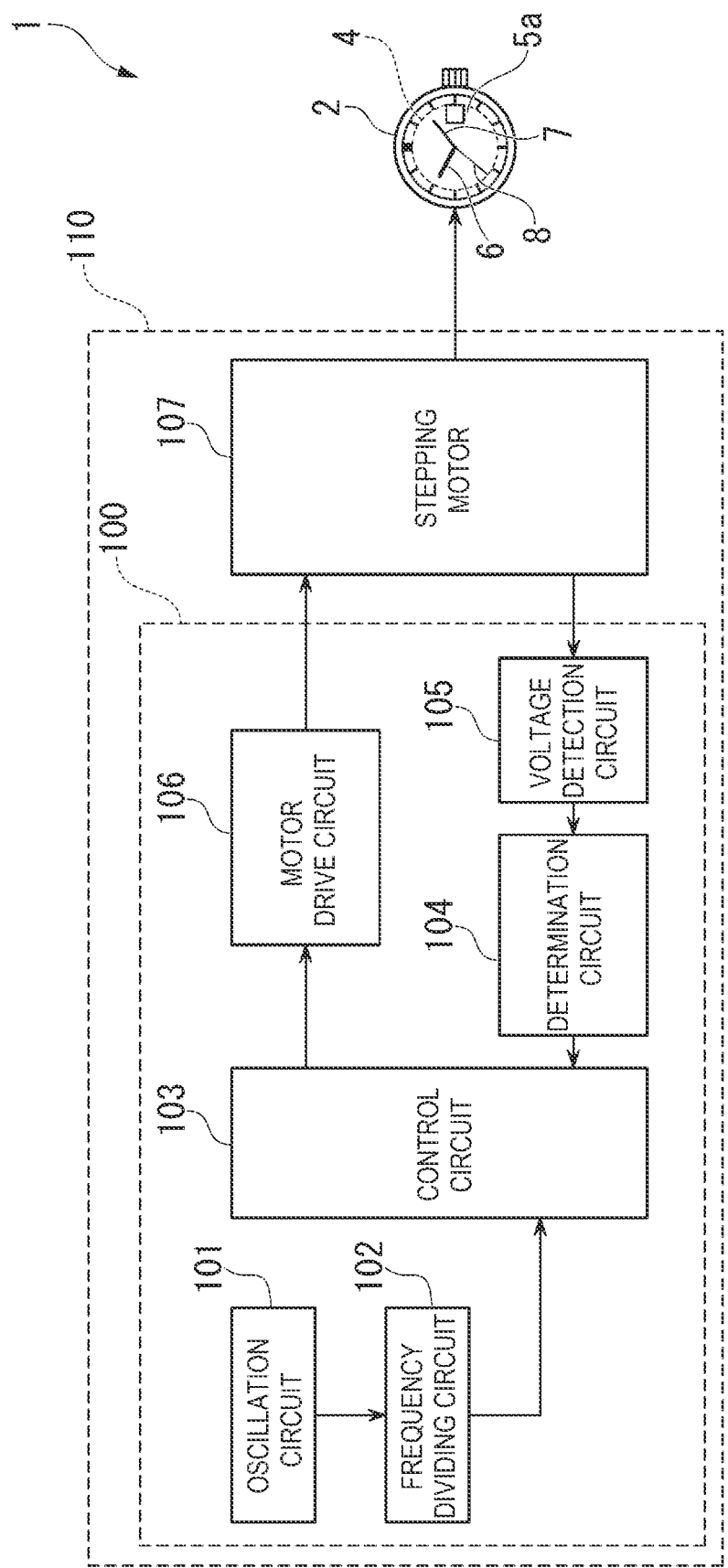
FIG. 4 is a diagram showing an example of a functional configuration of the timepiece according to the first embodiment.

FIG. 4 is a diagram showing an example of a functional configuration of the timepiece according to the first embodiment. A functional configuration of the timepiece 1 will be described with reference to FIG. 4. The timepiece 1 includes an oscillation circuit 101, a frequency dividing circuit 102, a control circuit 103, a determination circuit 104, a voltage detection circuit 105, a motor drive circuit 106, a stepping motor 107, the timepiece case 2, the movement 4, the hour hand 6, the minute hand 7, the second hand 8, and a date window 5a.

Hereinafter, the oscillation circuit 101, the frequency dividing circuit 102, the control circuit 103, the determination circuit 104, the voltage detection circuit 105, and the motor drive circuit 106 are collectively referred to as a stepping motor control device 100. The stepping motor control device 100 and the stepping motor 107 are also referred to as a hand drive unit 110.

That is, the movement 4 includes the stepping motor control device 100 and the stepping motor 107. The first motor 20A and the second motor 20B described above are examples of the stepping motor 107.

The oscillation circuit 101 generates a signal having a predetermined frequency, and outputs the generated signal to the frequency dividing circuit 102. The frequency dividing circuit 102 divides the signal input from the oscillation circuit 101 to generate a timepiece signal becoming a reference in counting times, and outputs the generated timepiece signal to the control circuit 103. The control circuit 103 outputs a control signal to each part of the timepiece 1 based on the timepiece signal or the like input from the frequency dividing circuit 102, and controls an operation of each part of the timepiece 1.

The motor drive circuit 106 acquires the control signal from the control circuit 103, and drives the stepping motor 107 based on the acquired control signal. When the acquired control signal is a drive pulse, the stepping motor 107 is driven by the motor drive circuit 106 to make the hour hand 6, the minute hand 7, and the second hand 8 rotate via the train wheel. When the acquired control signal is a swing pulse, the stepping motor 107 is driven by the motor drive circuit 106 to make the rotor swing.

The voltage detection circuit 105 detects an induced voltage generated in a coil when a rotor of the stepping motor 107 vibrates (swings). The voltage detection circuit 105 outputs the detected induced voltage to the determination circuit 104.

The determination circuit 104 determines a mechanical load received by the rotor provided in the stepping motor 107 based on a value of the induced voltage detected by the voltage detection circuit 105. For example, the determination circuit 104 determines the mechanical load received by the rotor based on whether the voltage value detected by the voltage detection circuit 105 exceeds a predetermined threshold.

[Configuration of Hand Drive Unit]

Figure 5:
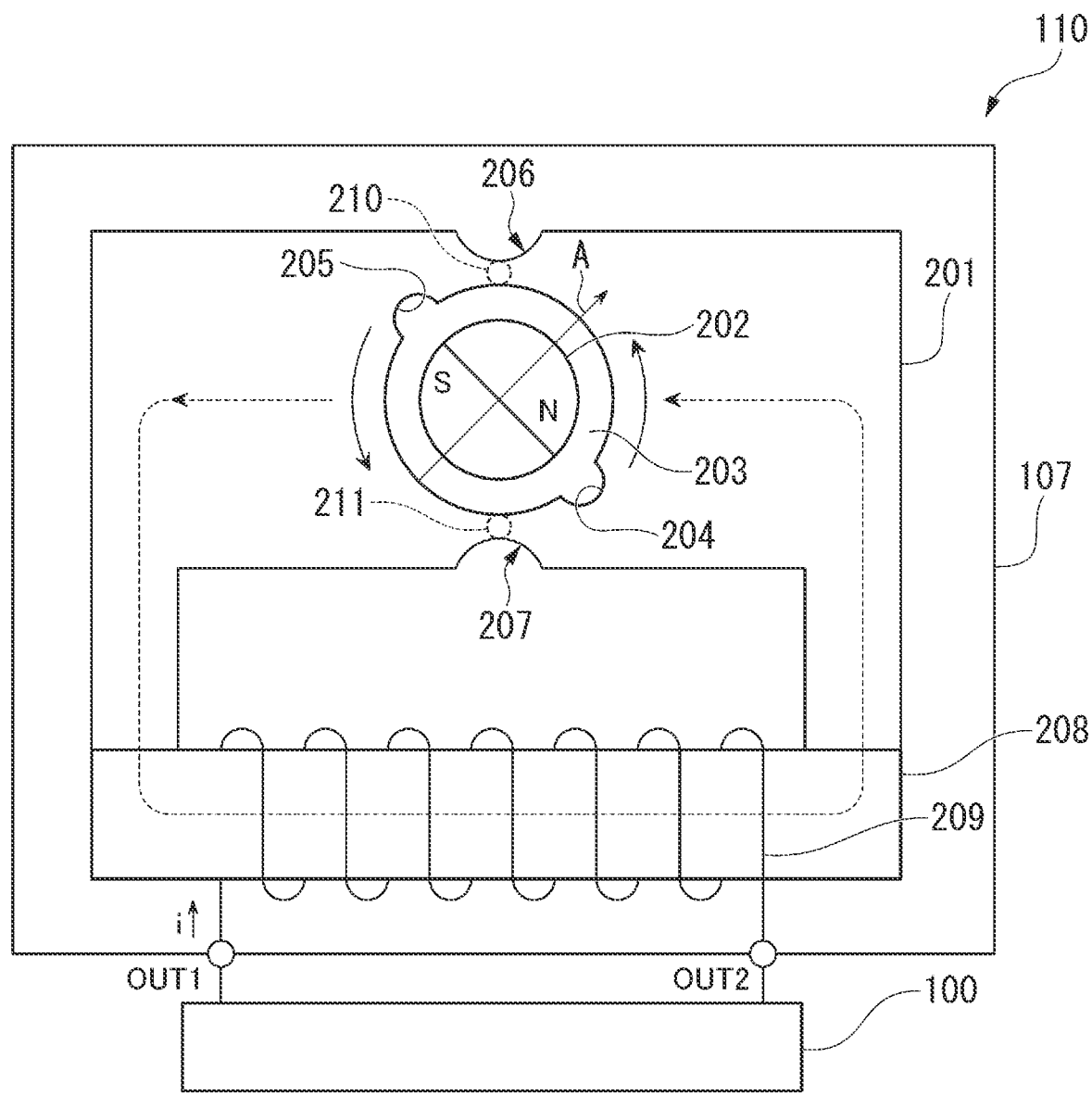
FIG. 5 is a diagram showing an example of a configuration of a hand drive unit according to the first embodiment.

FIG. 5 is a diagram showing an example of a configuration of the hand drive unit 110 according to the first embodiment.

The stepping motor 107 includes a stator 201, a rotor 202, a rotor accommodating through hole 203, an inner notch 204, an inner notch 205, an outer notch 206, an outer notch 207, a magnetic core 208, and a coil 209. Hereinafter, the rotor accommodating through hole 203 is also referred to as a rotor through hole.

The magnetic core 208 is a member made of a magnetic material and is joined to both ends of the stator 201. The coil 209 is wound around the magnetic core 208, one end of which is connected to a terminal OUT1, and the other end of which is connected to a terminal OUT2. The coil 209 generates a magnetic flux when a drive current i passes through the coil 209. The stator 201 is a member made of a magnetic material. The stator 201 gives the magnetic flux generated by the coil 209 to the rotor 202.

The rotor 202 is formed in a cylindrical shape and inserted in a state rotatable with respect to the rotor accommodating through hole 203 formed in the stator 201. That is, the stepping motor 107 includes the stator 201 provided with the rotor accommodating through hole 203, the rotor 202 rotatably disposed in the rotor accommodating through hole 203, and the coil 209 provided on the stator 201. The rotor 202 is magnetized and thus has an N pole and an S pole. In the following description, an axis from the S pole to the N pole of the rotor 202 is also referred to as a magnetic pole axis A, and a direction from the S pole to the N pole of the magnetic pole axis A is also referred to as a positive direction of the magnetic pole axis A (or simply a direction of the magnetic pole axis A).

The rotor 202 rotates in the forward rotation direction to make the hand rotate clockwise via the train wheel, and rotates in a reverse rotation direction to make the hand rotate counterclockwise via the train wheel. That is, the rotor 202 makes the hand rotate clockwise in the forward rotation direction, and makes the hand rotate in a reverse rotation direction that is a direction opposite to the forward rotation direction.

The inner notch 204 and the inner notch 205 are cutouts formed in a wall surface of the rotor accommodating through hole 203, and define a stop position of the rotor 202 with respect to the stator 201. That is, for example, when the coil 209 is not excited, the rotor 202 stops at a position where the magnetic pole axis is orthogonal to a line segment that connects the inner notch 204 and the inner notch 205.

The outer notch 206 and the outer notch 207 are cutouts formed in a curved inner side and a curved outer side of the stator 201, respectively. A saturable portion 210 is formed between the outer notch 206 and the rotor accommodating through hole 203, and a saturable portion 211 is formed between the outer notch 207 and the rotor accommodating through hole 203. The saturable portion 210 and the saturable portion 211 are not magnetically saturated by the magnetic flux of the rotor 202, and when the coil 209 is excited, the saturable portion 210 and the saturable portion 211 are magnetically saturated and magnetic resistances are increased.

[Driving of Stepping Motor]

The motor drive circuit 106 causes the coil 209 to generate the drive current i by applying the drive pulse between the terminals (the first terminal OUT1 and the second terminal OUT2) of the coil 209.

The stepping motor control device 100 reverses a direction of the drive current i flowing through the coil 209 according to the direction of the magnetic pole axis A at the stop position of the rotor 202, so that the rotor 202 rotates in a certain direction (for example, the forward rotation direction).

As an example, driving in the forward rotation direction will be described. When the stepping motor control device 100 supplies the drive pulse between the first terminal OUT1 and the second terminal OUT2 of the coil 209, the magnetic flux is generated in the stator 201. Accordingly, the saturable portion 210 and the saturable portion 211 are saturated, and the magnetic resistances increase, and then, due to interaction between magnetic poles generated by the stator 201 and the magnetic poles of the rotor 202, the rotor 202 rotates counterclockwise by 180 degrees and stops stably. By this rotation of about 180 degrees, the hand of the timepiece 1 can move by one indicator of a specified amount. An operation of the specified amount may be referred to as one step. A train wheel having an appropriate reduction ratio is appropriately disposed between the rotor 202 and the hand, so that the operation of the specified amount is performed.

In a case where the rotor 202 is in a state shown in FIG. 5, when the stepping motor control device 100 supplies the drive pulse between the first terminal OUT1 and the second terminal OUT2 of the coil 209, a current flows through the coil 209. In this example, when a pulse that has a high potential at the first terminal OUT1 and a low potential at the second terminal OUT2 (hereinafter, referred to as a positive direction) is applied, the current flows in the direction of the current i. When the current flows through the coil 209, the magnetic flux is generated in the stator 201. Due to this magnetic flux, the rotor 202 rotates counterclockwise by approximately 180 degrees and stops stably.

When the stepping motor control device 100 applies a pulse that has a low potential at the first terminal OUT1 and has a high potential at the second terminal OUT2 (hereinafter, referred to as a negative direction) when the rotor 202 is in a state of rotating by approximately 180 degrees from the state in FIG. 5, a magnetic flux in a direction opposite to that when the pulse is applied in the positive direction is generated in the stator 201. Accordingly, the saturable portion 210 and the saturable portion 211 are first saturated, and then the interaction between the magnetic poles generated by the stator 201 and the magnetic poles of the rotor 202 causes the rotor 202 to further rotate counterclockwise by approximately 180 degrees and stop stably. In this manner, by supplying the signals (alternating signals) having different polarities to the coil 209, the rotor 202 continuously rotates counterclockwise by approximately 180 degrees each time.

[Swing Pulse and Drive Pulse]

Figure 6A:
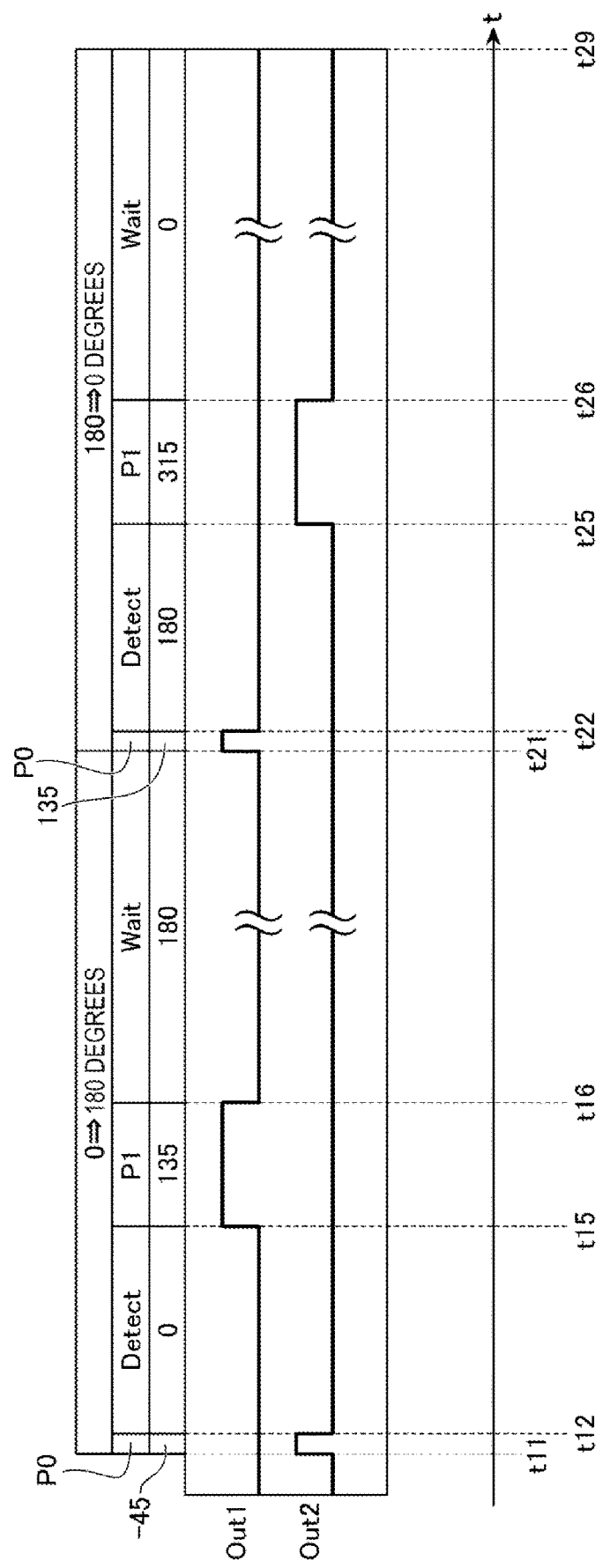
FIG. 6A is a diagram showing an example of a swing pulse and a drive pulse according to the first embodiment, and is the diagram showing a timing chart for illustrating a timing at which the swing pulse and the drive pulse are applied.
Figure 6B:
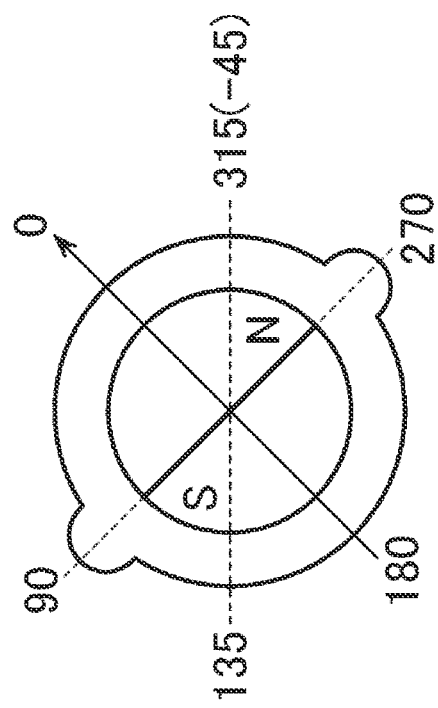
FIG. 6B is a diagram for explaining an angle of a rotor when the swing pulse and the drive pulse shown in FIG. 6A are applied to the rotor.

FIG. 6A is a diagram showing an example of the swing pulse and the drive pulse according to the first embodiment, and is the diagram showing a timing chart for illustrating a timing at which the swing pulse and the drive pulse are applied. FIG. 6B is a diagram for explaining an angle of a rotor when the swing pulse and the drive pulse shown in FIG. 6A are applied to the rotor. In FIG. 6A, a horizontal axis indicates a time, an "Out1" indicates a magnitude of a voltage applied to the first terminal OUT1 at each time, and an "Out2" indicates a magnitude of a voltage applied to the second terminal OUT2 at each time.

In FIG. 6B, the rotational position of the rotor 202 is described with a position of the magnetic pole axis A illustrated in FIG. 5 as 0 degrees and an angle at which the magnetic pole axis A rotates counterclockwise as a positive rotation angle. A control from a time t11 to a time t21 is to make the rotor 202 rotate clockwise from 0 degrees to 180 degrees, and a control from a time t21 to a time t29 is to make the rotor 202 rotate clockwise from 180 degrees to 0 degrees.

The control circuit 103 outputs a drive pulse to the motor drive circuit 106 to make the rotor 202 rotate, and outputs a swing pulse to the motor drive circuit 106 to make the rotor 202 swing. Hereinafter, the swing pulse and the drive pulse will be described, respectively.

From the time t11 to the time t12, the stepping motor control device 100 applies a pulse in the positive direction to the second terminal OUT2. When the pulse in the positive direction continues to be applied to the second terminal OUT2, the rotor 202 rests at a position after rotating by −45 degrees. When the stepping motor control device 100 stops applying the pulse at the time t12, the rotor 202 is pulled back to a position of 0 degrees and comes to rest. Here, when the rotor 202 returns from the position of −45 degrees to the position of 0 degrees, the rotor 202, at least once due to inertia, rotates counterclockwise to a position of a positive rotation angle, and rotates clockwise to a position of a negative rotation angle. The rotor 202 repeats rotating counterclockwise and clockwise. That is, the rotor 202 vibrates and comes to rest at the position of 0 degrees due to attenuation of the vibration.

The pulse applied from the time t11 to the time t12 is not a pulse intended to make the rotor 202 rotate by approximately 180 degrees, but a pulse intended to detect a vibration state of the rotor 202 by making the rotor 202 vibrate. Hereinafter, the pulse intended to make the rotor 202 vibrate is referred to as a swing pulse in order to be distinguished from a normal drive pulse.

A time during which the swing pulse is applied may be sufficient for the rotor 202 to vibrate, and it is unnecessary to apply the pulse until the rotor 202 comes to rest at the rotational position of −45 degrees.

From the time t12 to the time t15, the stepping motor control device 100 determines the mechanical load received by the rotor 202 due to the application of the swing pulse. Specifically, based on the voltage detected by the voltage detection circuit 105, the determination circuit 104 determines the mechanical load received by the rotor 202.

The determination circuit 104 may determine the mechanical load received by the rotor 202 based on a timing when the voltage detection circuit 105 detects a voltage value exceeding a predetermined voltage value in addition to the magnitude of the voltage detected by the voltage detection circuit 105 or instead of the magnitude of the voltage detected by the voltage detection circuit 105. For example, the determination circuit 104 may determine the mechanical load received by the rotor 202 based on whether a timing of generation of the voltage value detected by the voltage detection circuit 105 is within a predetermined period.

From the time t15 to the time t16, the stepping motor control device 100 applies a pulse in the positive direction to the first terminal OUT1. When the pulse in the positive direction is continuously applied to the first terminal OUT1, the rotor 202 rests at a position after rotating by 135 degrees. When the stepping motor control device 100 stops applying the pulse at the time t16, the rotor 202 is pulled to a position of 180 degrees and comes to rest. The pulse applied from the time t15 to the time t16 is a drive pulse because it is a pulse for making the rotor 202 rotate by approximately 180 degrees. The drive pulse is output by the control circuit 103. That is, the control circuit 103 outputs a swing pulse and then outputs a drive pulse after a lapse of a predetermined period.

The time during which the drive pulse is applied (a pulse width of the drive pulse) may be sufficient for the rotor 202 to rotate by 180 degrees, and it is unnecessary to apply the pulse until the rotor 202 comes to rest at the rotational position of 135 degrees.

The time during which the drive pulse is applied may be determined according to the mechanical load determined by the determination circuit 104. In this case, the control circuit 103 controls an output time of the drive pulse according to the mechanical load determined by the determination circuit 104.

From the time t21 to the time t22, the stepping motor control device 100 applies the pulse in the positive direction, that is, the swing pulse, to the first terminal OUT1. When the pulse in the positive direction is continuously applied to the first terminal OUT1, the rotor 202 rests at the position after rotating by 135 degrees. When the stepping motor control device 100 stops applying the pulse at the time t22, the rotor 202 is pulled back to the position of 180 degrees and comes to rest. Here, the rotor 202 vibrates when returning from the position of 135 degrees to the position of 180 degrees and comes to rest at the position of 180 degrees due to the attenuation of the vibration.

From the time t22 to the time t25, the stepping motor control device 100 determines the mechanical load received by the rotor 202 due to application of the swing pulse. Specifically, based on the voltage detected by the voltage detection circuit 105, the determination circuit 104 determines the mechanical load received by the rotor 202.

From the time t25 to the time t26, the stepping motor control device 100 applies a pulse in the positive direction, that is, the drive pulse, to the second terminal OUT2. When the pulse in the positive direction is continuously applied to the second terminal OUT2, the rotor 202 rests at a position after rotating by 315 degrees. When the stepping motor control device 100 stops applying the pulse at the time t26, the rotor 202 is pulled to a position of 0 degrees and comes to rest.

That is, the control circuit 103 (a control unit) outputs, to the motor drive circuit 106 (a drive unit), a drive pulse for making the rotor 22 rotate stepwise every half rotation and a swing pulse for making the rotor 22 swing.

Figure 7:
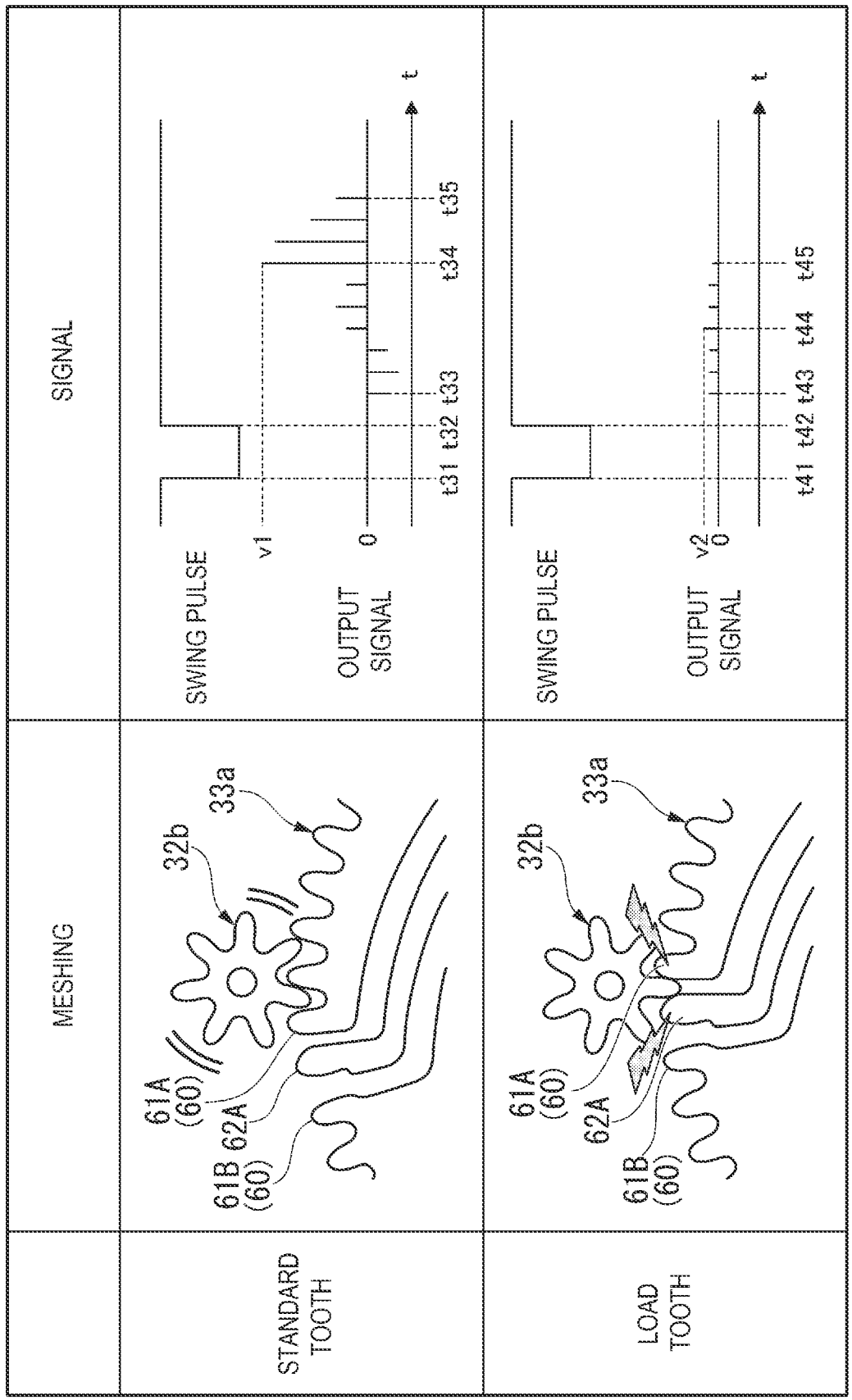
FIG. 7 is a diagram showing an example of a vibration when a load tooth meshes with a pinion and a vibration when a standard tooth meshes with a pinion according to the first embodiment.

FIG. 7 is a diagram showing an example of a vibration when a load tooth meshes with a pinion and a vibration when a standard tooth meshes with a pinion according to the first embodiment. With reference to FIG. 7, the vibration when the load tooth meshes with the pinion and the vibration when the standard tooth meshes with the pinion will be illustrated.

An upper part of the drawing is an example of a case where the standard tooth meshes with the pinion, and a lower part of the drawing is an example of a case where the load tooth meshes with the pinion. Specifically, an example in which the second wheel 33 having the load tooth 62 meshes with the third wheel pinion 32b is illustrated. In the illustration in FIG. 7, the second wheel 33 may be simply referred to as a gear (or a second gear), and the third wheel pinion 32b may be simply referred to as a pinion (or a first gear). The first gear is a gear that rotates based on the rotation of the rotor 202, and the second gear is a gear having a load tooth.

A left side of the drawing is a diagram showing a state where the gear meshes with the pinion. A right side of the drawing is a diagram showing a timing of applying the swing pulse and a timing of generating the induced voltage.

First, in the upper part, an example of a case where the standard tooth 61 meshes with the pinion is illustrated. As shown in an upper left side of the drawing, when the rotor 202 that drives the pinion by applying the swing pulse vibrates, the pinion vibrates due to the vibration of the rotor 202. A range in which the rotor 202 can vibrate varies depending on a magnitude of backlash between the gear and the pinion. When the standard tooth 61 meshes with the pinion, the backlash is large, and thus the rotor 202 can vibrate in a wide range.

As shown in an upper right side of the drawing, the swing pulse is applied from a time t31 to a time t32. Based on the applied swing pulse, the rotor 202 vibrates, and an induced voltage is generated from a time t33 to a time t35. When the standard tooth 61 meshes with the pinion, the rotor 202 can vibrate in a wide range, and thus the induced voltage to be generated also increases. In the example shown in FIG. 7, a voltage v1 is generated at the time t34. When the voltage v1 is larger than a determination threshold, the determination circuit 104 determines that the pinion is not in contact with the load tooth of the gear.

Next, in the lower part, an example of a case where the load tooth 62 meshes with the pinion is illustrated. As shown in a lower left side of the drawing, when the rotor 202 that drives the pinion by applying the swing pulse vibrates, the pinion vibrates due to the vibration of the rotor 202. However, since the backlash is small when the load tooth 62 meshes with the pinion, the rotor 202 can vibrate in a small range.

As shown in a lower right side of the drawing, the swing pulse is applied from a time t41 to a time t42. Based on the applied swing pulse, the rotor 202 vibrates, and an induced voltage is generated from a time t43 to a time t45. However, when the load tooth 62 meshes with the pinion, the rotor 202 can vibrate in a small range, and thus the induced voltage to be generated also decreases. In the example shown in FIG. 7, a voltage v2 is generated at the time t44. The voltage v2 is smaller than the voltage v1. When the voltage v1 is smaller than the determination threshold, the determination circuit 104 determines a mechanical load in which the pinion is in contact with the load tooth of the gear.

The vibration decreases when the pinion is meshed between the load tooth 62 and the first standard tooth 61A, whereas the vibration increases when the pinion is meshed between the load tooth 62 and the second standard tooth 61B. Both of the vibrations may be compared with a vibration when the standard tooth 61 meshes with the pinion to detect a position of the hand.

Figure 8:
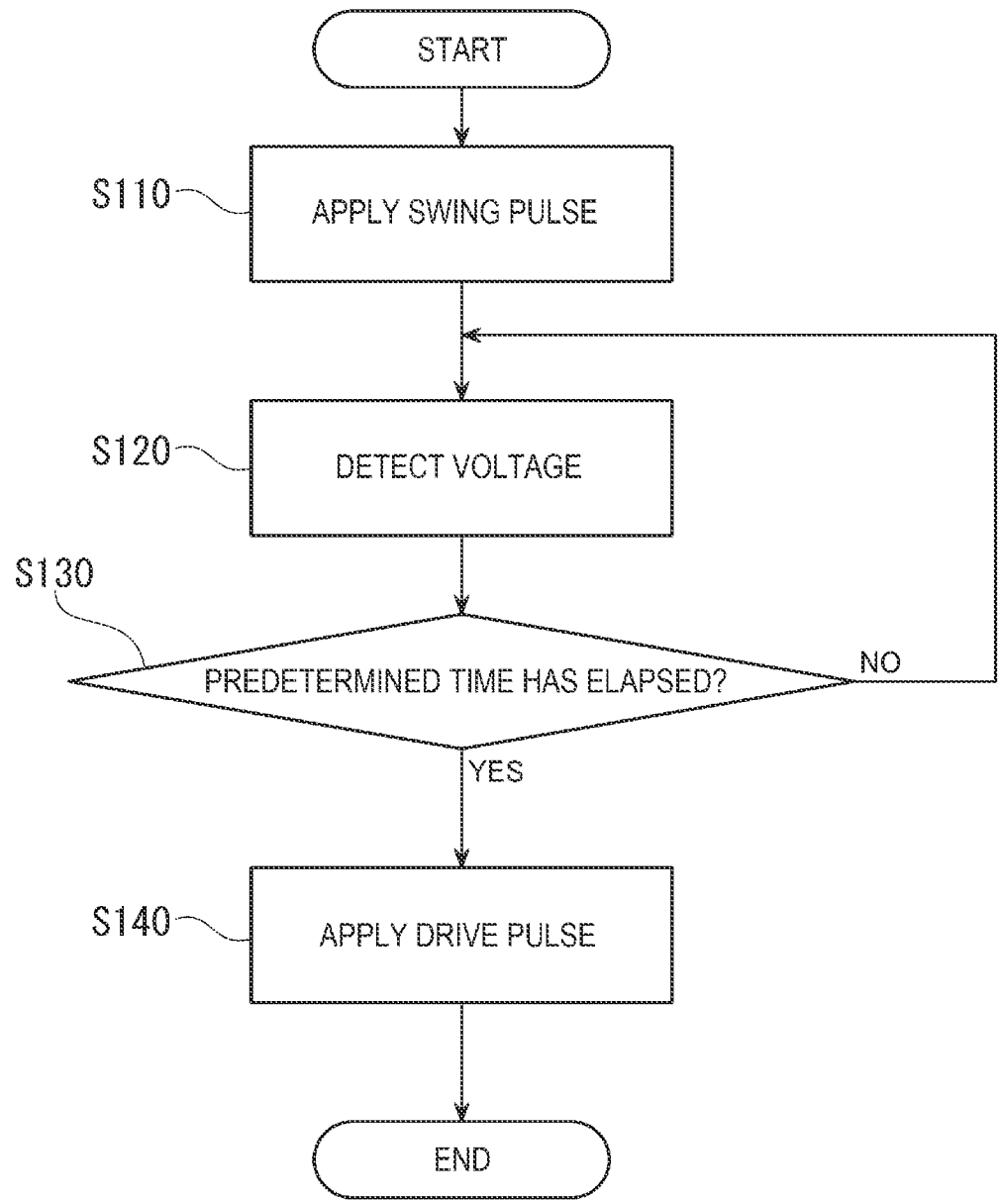
FIG. 8 is a flowchart showing an example of an operation of a stepping motor control device according to the first embodiment.

FIG. 8 is a flowchart showing an example of an operation of the stepping motor control device 100 according to the first embodiment. A series of operations of the stepping motor control device 100 will be illustrated with reference to FIG. 8.

(Step S110) The control circuit 103 outputs the swing pulse to the motor drive circuit 106. The motor drive circuit 106 drives the stepping motor 107 based on the acquired swing pulse.

(Step S120) The voltage detection circuit 105 detects the induced voltage caused by the vibration of the rotor 202. The determination circuit 104 determines the mechanical load of the rotor 202 based on the value of the detected induced voltage or the timing at which the induced voltage is detected.

(Step S130) When a predetermined time elapses from output of the swing pulse (step S130; YES), the control circuit 103 advances a process to step S140. When the predetermined time does not elapse from the output of the swing pulse (step S130; NO), the voltage detection circuit 105 repeats step S120.

(Step S140) The control circuit 103 outputs the drive pulse to the motor drive circuit 106. The magnitude (a voltage and a time) of the drive pulse may be a predetermined value determined in advance, or may be a value based on the mechanical load of the rotor 202 determined in step S120.

[Regarding Reduction Ratio of Train Wheel]

Here, the reduction ratio of the train wheel of the present embodiment is compared with a reduction ratio of a train wheel according to a comparative example.

(1) Reduction Ratio of Train Wheel of Present Embodiment (Example)

The number of the teeth of the gears and the number of the teeth of the pinions which constitute the train wheel (the hour train wheel 31) of the present embodiment are as follows:

the number of the teeth of the pinion of the rotor 22:8
the number of the teeth of the gear of the third wheel 32:40
the number of the teeth of the pinion of the third wheel 32:10
the number of the teeth of the gear of the second wheel 33:45
the number of the teeth of the pinion of the second wheel 33:7
the number of the teeth of the gear of the first wheel 34:56

That is, the number of the teeth of the second wheel 33 is an odd number.

Here, the rotor 22 rotates 180 degrees per step. That is, the rotor 22 makes one rotation by two steps.

The third wheel 32 rotates at a reduction ratio of 5 with respect to the rotor 22. That is, the third wheel 32 makes one rotation every 5 rotations (that is, 10 steps) of the rotor 22 of the first motor 20A.

The second wheel 33 rotates at a reduction ratio of 4.5 with respect to third wheel 32. That is, the second wheel 33 makes one rotation every 22.5 rotations (that is, 45 steps) of the rotor 22 of the first motor 20A.

The first wheel 34 rotates at a reduction ratio of 8 with respect to the second wheel 33. That is, the first wheel 34 makes one rotation every 180 rotations (that is, 360 steps) of the rotor 22 of the first motor 20A.

In the above-described reduction ratios of the train wheel, a matter that the second wheel 33 makes one rotation every 22.5 rotations (that is, 45 steps) of the rotor 22 means that the rotor 22 has an odd number of the rotation steps when the second wheel 33 makes one rotation.

That is, the hour train wheel 31 (the train wheel) includes a load gear which has a load tooth whose rotation load is different from those of other teeth and in which the rotor 22 has an odd number of the rotation steps when the rotor 22 rotates once, and transmits a rotation force to the hand from the rotor 22.

The hour train wheel 31 (the train wheel) includes the first wheel 34 that rotates at an angular velocity matching an angular velocity of the hand, the second wheel 33 that has the pinion meshing with the gear of the first wheel 34 and the load gear, and the third wheel 32 that has the pinion meshing with the load gear of the second wheel 33 and the gear meshing with the rotor 22.

(2) Reduction Ratio of Train Wheel of Comparative Example (Example)

The number of the teeth of the gear and the number of the teeth of the pinion which constitute the train wheel (the hour train wheel) according to the comparative example are as follows:

the number of the teeth of the pinion of the rotor: 6
the number of the teeth of the gear of the third wheel: 36
the number of the teeth of the pinion of the third wheel: 12
the number of the teeth of the gear of the second wheel: 60
the number of the teeth of the pinion of the second wheel: 10
the number of the teeth of the gear of the first wheel: 60

This rotor rotates 180 degrees per step, similar to the rotor 22 of the present embodiment. That is, this rotor makes one rotation by two steps.

The third wheel rotates at a reduction ratio of 6 with respect to the rotor. That is, the third wheel makes one rotation every 6 rotations (that is, 12 steps) of the rotor.

The second wheel rotates at a reduction ratio of 5 with respect to the third wheel. That is, the second wheel makes one rotation every 30 rotations (that is, 60 steps) of the rotor.

The first wheel rotates at the reduction ratio of 6 with respect to the second wheel. That is, the first wheel makes one rotation every 180 rotations (that is, 360 steps) of the rotor.

In the reduction ratio of the train wheel according to the comparative example, a matter that the second wheel makes one rotation every 30 rotations (that is, 60 steps) of the rotor means that the number of the rotation steps of the rotor when the second wheel makes one rotation is an even number.

[Relation between Directions of Magnetic Poles of Rotor and Rotational Position of Load Tooth]

Here, an assembling direction of the rotor 22 with respect to the train wheel (the hour train wheel 31) will be described. The rotor 22 (the rotor 202 shown in FIG. 5) is magnetized to two poles of the N pole and the S pole. The magnetic poles (the N pole and the S pole) of the rotor 202 are difficult to visually distinguish. Therefore, when the load tooth 62 of the second wheel 33 is positioned to mesh with the third wheel 32, the rotor may be assembled such that the direction of the magnetic poles of the rotor 202 in the stator 201 is a first direction (for example, a direction as shown in FIG. 5), or a second direction (for example, a direction rotated 180 degrees from the direction shown in FIG. 5).

In the following description, the case where the rotor 202 is assembled in the first direction described above is also referred to as a "first direction assembly" (or a "front assembly"), and the case where the rotor 202 is assembled in the second direction described above is also referred to as a "second direction assembly" (or a "back assembly").

[Configuration of Voltage Detection Circuit]

(1) Configuration of Voltage Detection Circuit of Present Embodiment

Figure 9:
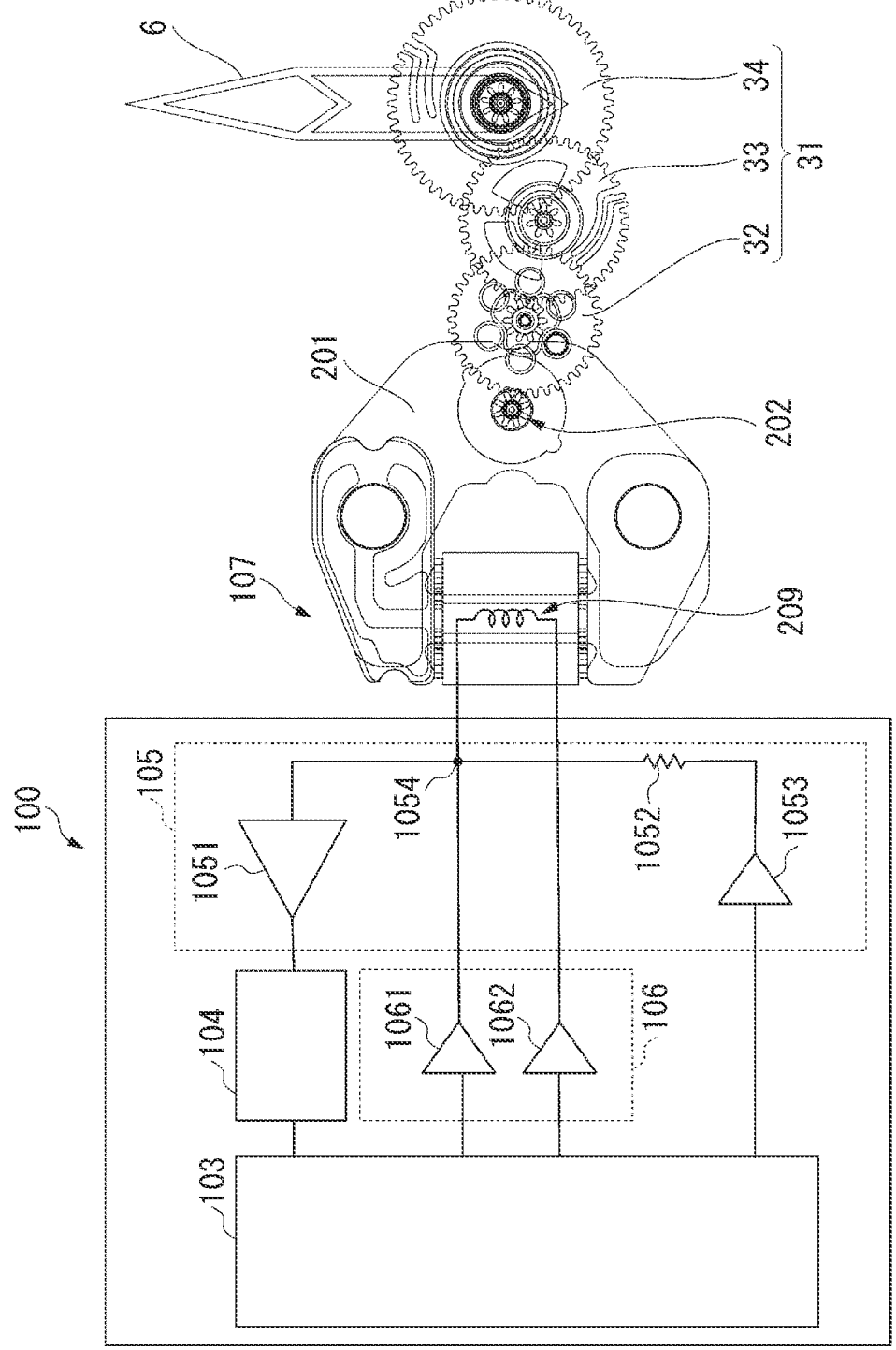
FIG. 9 is a diagram showing an example of a specific configuration of the stepping motor control device according to the present embodiment.

FIG. 9 is a diagram showing an example of a specific configuration of the stepping motor control device 100 of the present embodiment.

The motor drive circuit 106 includes a first driver 1061 and a second driver 1062. An output terminal of the first driver 1061 is connected to one end of the coil 209. An output terminal of the second driver 1062 is connected to the other end of the coil 209. The first driver 1061 and the second driver 1062 each mutually and exclusively output a drive current to the coil 209, so that directions of the currents flowing through the coil 209 are switched. Accordingly, an alternating magnetic field is generated in the stator 201, and the rotor 202 rotates in a predetermined direction.

That is, the motor drive circuit 106 (the drive unit) is a circuit for driving the stepping motors (the first motor 20A and the second motor 20B) including the rotors 22 making the hand rotate and the coil 209 generating the magnetic flux for making the rotor 22 rotate. The motor drive circuit 106 (the drive unit) includes the first driver 1061 (a first drive circuit) configured to supply the first current flowing in a direction from a first end portion to a second end portion of the coil 209, and the second driver 1062 (a second drive circuit) configured to supply the second current flowing in a direction from the second end portion to the first end portion.

The voltage detection circuit 105 includes a comparator 1051, a voltage detection resistor 1052, and a voltage detection switch 1053.

The voltage detection resistor 1052 is connected between a voltage detection point 1054 and the voltage detection switch 1053. The voltage detection resistor 1052 has a relatively high resistance value. When a current flows between the voltage detection point 1054 and the voltage detection switch 1053, a relatively large potential difference is generated at two ends of the voltage detection resistor 1052. The voltage detection point 1054 is located between the first driver 1061 and the one end of the coil 209 and indicates a potential of the one end of the coil 209.

The voltage detection switch 1053 operates based on a control of the control circuit 103, and switches states between a state (for example, an ON state) where a current flows through the voltage detection resistor 1052 and a state (for example, a high impedance state) where no current flows.

When the voltage detection switch 1053 is in the ON state, the comparator 1051 outputs, to the determination circuit 104 described above, a signal indicating whether a voltage at the voltage detection point 1054 exceeds a predetermined threshold voltage.

That is, when the rotor 22 vibrates, the voltage detection circuit 105 (a voltage detection unit) detects an induced voltage generated at one end portion out of the first end portion and the second end portion of the coil 209.

Based on the result detected by the voltage detection circuit 105 (the voltage detection unit), the determination circuit 104 (a determination unit) determines the mechanical load received by the rotor 22 due to contact of the load tooth of the load gear with the teeth meshing with the load gear.

The determination circuit 104 (the determination unit) may be configured to respectively determine a first load which is a mechanical load received by the rotor 22 due to contact of the pinion of the second wheel 33 with the load tooth of the first wheel 34, and a second load which is a mechanical load received by the rotor 22 due to contact of the pinion of the third wheel 32 with the load tooth of the second wheel 33.

(2) Configuration of Voltage Detection Circuit According to Comparative Example

Figure 13:
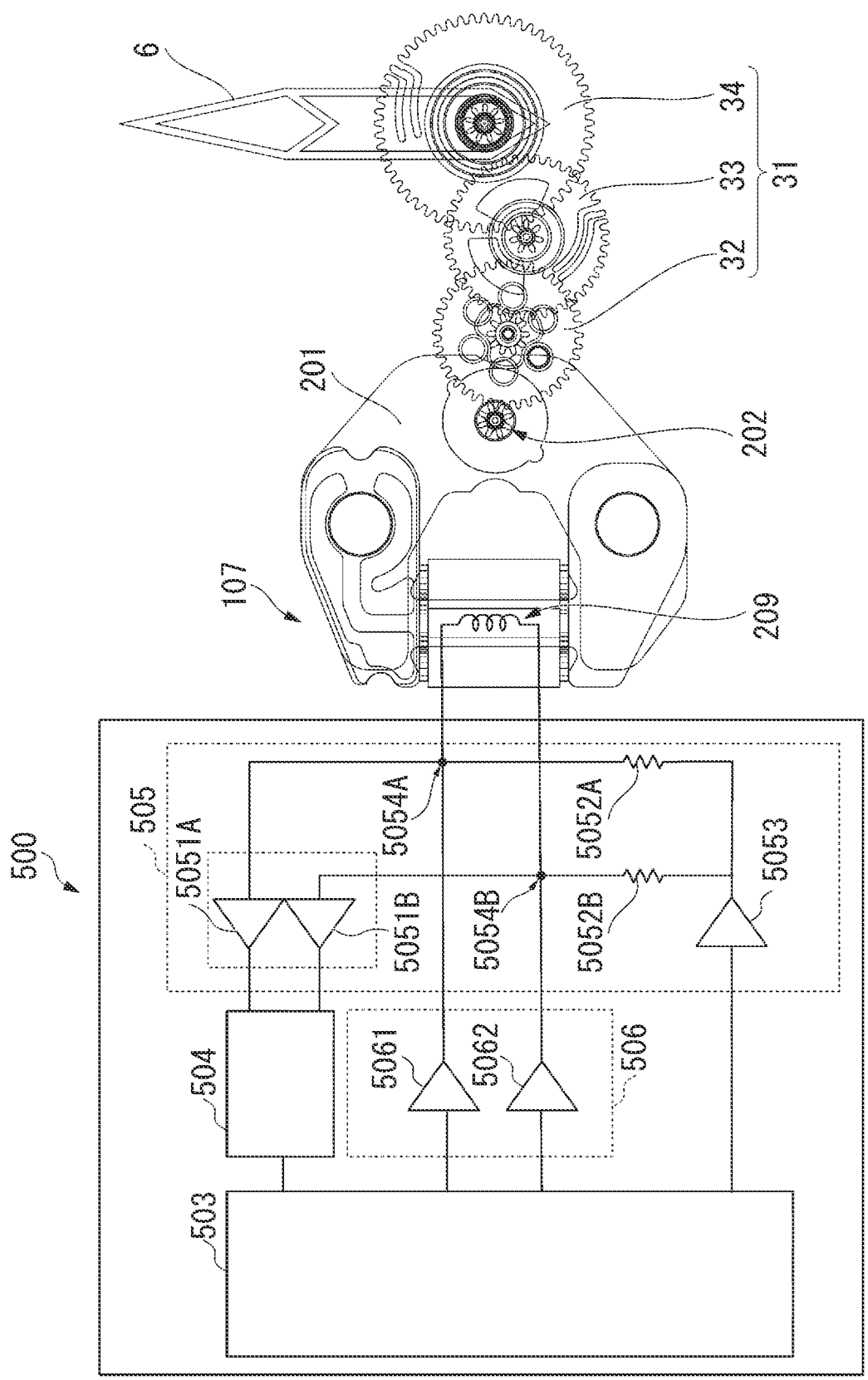
FIG. 13 is a diagram showing an example of a specific configuration of a stepping motor control device according to a comparative example.

FIG. 13 is a diagram showing an example of a specific configuration of a stepping motor control device 500 according to the comparative example.

A detection circuit according to the comparative example includes a control circuit 503, a determination circuit 504, a voltage detection circuit 505, and a motor drive circuit 506.

The control circuit 503, the determination circuit 504, and the motor drive circuit 506 have the same configurations as the control circuit 103, the determination circuit 104, and the motor drive circuit 106 of the present embodiment, respectively, and the descriptions are omitted.

The voltage detection circuit 505 is different from the voltage detection circuit 105 of the present embodiment in that the voltage detection circuit 505 is configured to detect voltages at two points, a first voltage detection point 5054A and a second voltage detection point 5054B. More specifically, the voltage detection circuit 505 includes a first comparator 5051A and a first voltage detection resistor 5052A, and detects a voltage at the first voltage detection point 5054A. The voltage detection circuit 505 includes a second comparator 5051B and a second voltage detection resistor 5052B, and detects a voltage at the second voltage detection point 5054B.

That is, the voltage detection circuit 505 according to the comparative example is configured to be capable of detecting the voltages at the two ends of the coil 209.

Figure 14:
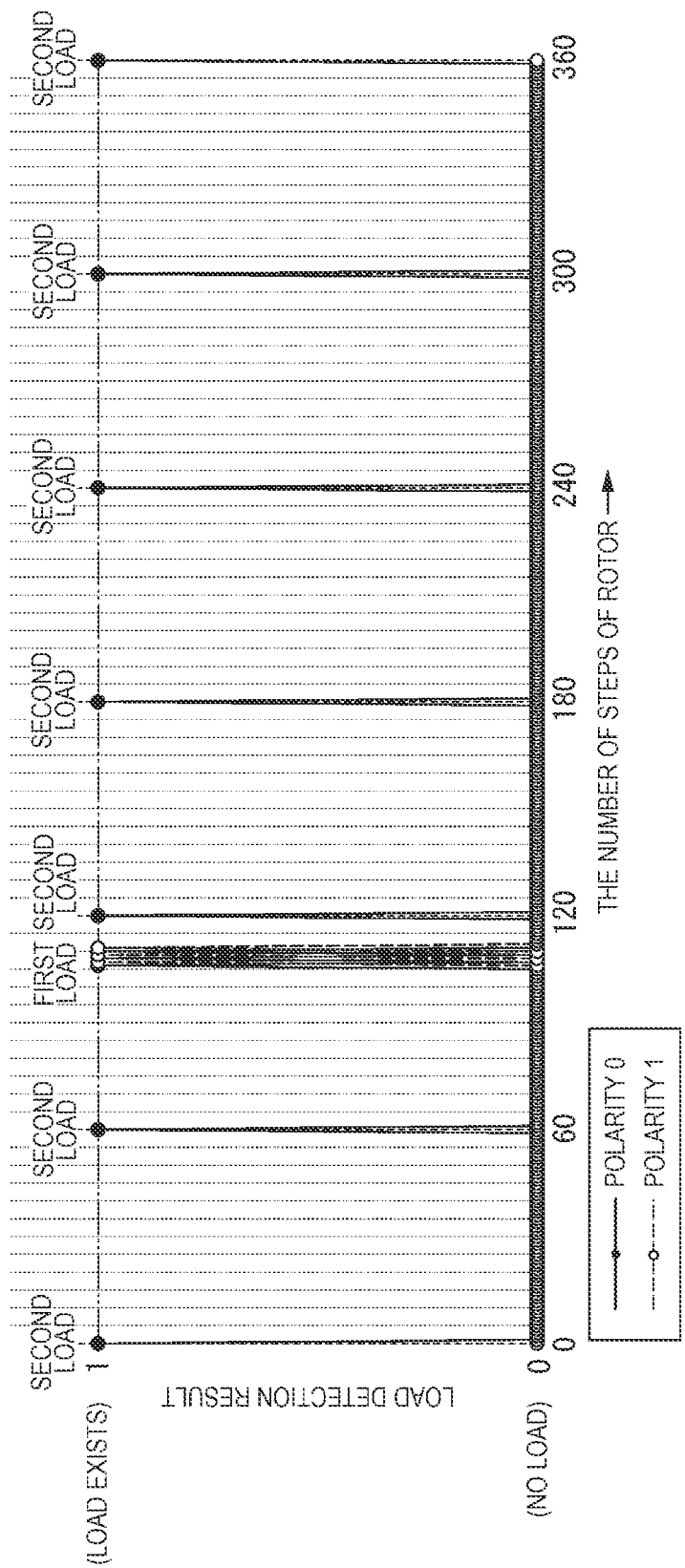
FIG. 14 is a diagram showing an example of an occurrence timing of load fluctuation according to the comparative example.

Comparison of Voltage Detection Circuit According to Comparative Example with Voltage Detection Circuit According to Present Embodiment FIG. 14 is a diagram showing an example of an occurrence timing of a load fluctuation according to the comparative example.

In the case of the configuration of the train wheel of the comparative example described above, the second wheel makes one rotation every 60 steps of the rotor. Therefore, in any one step of the 60 steps of the rotor, the load tooth of the second wheel meshes with the pinion of the third wheel to cause a load fluctuation. For example, as shown in FIG. 14, when the number of the steps of the rotor is around 105 to 110 steps, the first load is generated, and when the number of the steps of the rotor is 0 steps, 60 steps, 120 steps . . . or 360 steps, the second load is generated.

As described above, the rotor may be assembled in the first direction (that is, the front assembly) or assembled in the second direction (that is, the back assembly).

When the rotor is assembled in the first direction, the second load is always detected only in a polarity 0, and when the rotor is assembled in the second direction, the second load is always detected only in a polarity 1.

FIG. 15 is a diagram showing an example of a relation between a method for assembling the rotor and the occurrence timing of the load fluctuation according to the comparative example.

[A] in FIG. 15 shows a generation timing of the first load when the rotor is assembled in front. [B] in FIG. 15 shows a generation timing of the first load when the rotor is assembled in back.

FIG. 15 shows the generation timings of the first load, but similar to the first load, generation timings of the second load are also different between the case where the rotor is assembled in front and the case where the rotor is assembled in back.

Specifically, when the rotor is assembled in front and when the rotor is assembled in back, the polarities of the drive pulses (that is, the directions of the currents flowing through the drive coil) that make the rotor rotate are different from each other at the position where the load fluctuation due to the load tooth of the second wheel occurs. That is, when the rotor is assembled in front and when the rotor is assembled in back, the polarities of the voltages induced in the drive coil caused by the load fluctuation due to the load tooth are different from each other.

Therefore, in the case of the configuration of the train wheel of the comparative example described above, in order to detect the induced voltage due to the load fluctuation due to load tooth in both front and back assemblies, a circuit configuration capable of detecting two types of induced voltages with different polarities is necessary. Therefore, in the case of the configuration of the train wheel according to the comparative example, the circuit configuration is such that these two types of induced voltages are detected by the first comparator 5051A and the second comparator 5051B described above, respectively.

That is, in the case of the configuration of the train wheel according to the comparative example, in order to detect the induced voltages due to the load fluctuation of the load tooth, two comparators are required for each drive coil.

Meanwhile, in the case of the configuration of the train wheel (the hour train wheel 31) of the present embodiment, the second wheel makes one rotation every 45 steps of the rotor 202. Therefore, in any one step of the 45 steps of the rotor 202, the load tooth of the second wheel meshes with the pinion of the third wheel to cause a load fluctuation. That is, in the case of the configuration of the train wheel (the hour train wheel 31) of the present embodiment, the load fluctuates every time the rotor 202 rotates in an odd number of steps.

Therefore, regardless of whether the rotor 202 is assembled in front or back, the polarities of the voltage induced in the drive coil due to the load fluctuation of the load tooth 62 are changed every time the load fluctuation occurs.

Thus, in the case of the configuration of the train wheel (the hour train wheel 31) of the present embodiment, the load fluctuation due to the load tooth occurs every 90 steps at the first voltage detection point 5054A regardless of whether the rotor is assembled in front or back. Therefore, the induced voltage can be detected by only one comparator that detects the induced voltage of either polarity.

That is, in the case of the configuration of the train wheel (the hour train wheel 31) of the present embodiment, in order to detect the induced voltages due to the load fluctuation of the load tooth, it is sufficient to provide one comparator (for example, the comparator 1051) for each drive coil.

As described above, the stepping motor control device 100 of the present embodiment may include one comparator for each drive coil. That is, according to the stepping motor control device 100 of the present embodiment, the number of the comparators for detecting the induced voltage can be reduced by one for each drive coil as compared with the comparative example.

Therefore, according to the stepping motor control device 100 of the present embodiment, the circuit configuration of the voltage detection circuit 105 can be simplified.

According to the stepping motor control device 100 of the present embodiment, the number of the comparators for detecting the induced voltage can be reduced by one for each drive coil, and thus when a plurality of stepping motors are provided in one movement, the circuit configuration of the voltage detection circuit 105 can be further simplified.

[Modification (2-Coil Motor)]

In the stepping motor control device 100 of the present embodiment described above, the case where both the first motor 20A and the second motor 20B are one-coil motors in which one coil is provided for one rotor 22 is described, but the invention is not limited thereto.

Specifically, the number of the steps of the rotor 22 per rotation of the load gear may be an odd number as described above, and both the first motor 20A and the second motor 20B may be two-coil motors including two coils for one rotor 22.

That is, the stepping motors (the first motor 20A and the second motor 20B) of the present modification include a plurality of coils 209. The motor drive circuit 106 (the drive unit) of the present modification includes a set of a first driver (the first drive circuit) and a second driver (the second drive circuit) corresponding to each of the plurality of coils 209.

As described above, in the case of the one-coil motor, a mounting angle of the rotor determines whether the induced voltage generated due to the load fluctuation of the load tooth 62 is generated at either the first end portion of the coil or the second end portion of the coil. That is, in the case of the two-coil motor, two terminals where an induced voltage is generated are present. Therefore, in the case of the comparative example in which the number of the steps of the rotor 22 per rotation of the load gear is an even number, two comparators are required for detecting the induced voltage in the one-coil motor.

Here, in the case of the two-coil motor, a mounting angle of the rotor determines whether the induced voltage generated due to the load fluctuation of the load tooth 62 is generated at any one of a first end portion of a first coil, a second end portion of the first coil, a first end portion of a second coil, and a second end portion of the second coil. That is, in the case of the two-coil motor, four terminals where the induced voltage is generated are present. Therefore, in the case of the two-coil motor according to the comparative example, four comparators are required for induced voltage detection as follows.

FIG. 16 is a diagram showing an example of a specific configuration of a stepping motor control device in the case of the two-coil motor according to the comparative example. In the case of the two-coil motor, a stepping motor control device 500a according to the comparative example includes a voltage detection circuit 505a and a motor drive circuit 506.

The drive circuit 506 in the present modification includes four (or two sets of) drivers 5062a that drive two coils of a coil 209A and a coil 209B.

The voltage detection circuit 505a is configured to detect voltages at four points, the first voltage detection point 5054A to a fourth voltage detection point 5054D. More specifically, the voltage detection circuit 505a includes the first comparator 5051A and the first voltage detection resistor 5052A, and detects the voltage at the first voltage detection point 5054A. The voltage detection circuit 505a includes the second comparator 5051B and the second voltage detection resistor 5052B, and detects the voltage at the second voltage detection point 5054B. The voltage detection circuit 505a includes a third comparator 5051C and a third voltage detection resistor 5052C, and detects a voltage at the third voltage detection point 5054C. The voltage detection circuit 505a includes a fourth comparator 5051D and a fourth voltage detection resistor 5052D, and detects a voltage at the fourth voltage detection point 5054D.

The voltage detection circuit 505a according to the comparative example is configured to be capable of detecting voltages at two ends of the coil 209A and voltages at two ends of the coil 209B.

That is, the voltage detection circuit 505a according to the comparative example includes four comparators.

When the load is detected in the forward rotation, the comparator 5051A detects the induced voltage generated at the voltage detection point 5054A after the swing pulse is output from the driver 5062a. The comparator 5051B detects the induced voltage generated at the voltage detection point 5054B after the swing pulse is output from a driver 5061a. When the load is detected in the reverse rotation, the comparator 5051D detects the induced voltage generated at the voltage detection point 5054D after the swing pulse is output from a driver 5061b. The comparator 5051C detects the induced voltage generated at the voltage detection point 5054C after the swing pulse is output from a driver 5062b.

The forward rotation drive pulse after the swing pulse is output from the driver 5062a is output in order of the driver 5062a and the driver 5062b. The forward rotation drive pulse after the swing pulse is output from the driver 5061a is output in order of the driver 5061a and the driver 5061b.

Meanwhile, when the number of the steps of the rotor 22 per rotation of the load gear of the second wheel is set to an odd number, the number of comparators can be halved as in the stepping motor control device 100 described above. Therefore, according to the stepping motor control device 100, in the case of the two-coil motor, two comparators may be provided for detecting the induced voltage, and the number of comparators can be reduced by two as compared with the comparative example.

Figure 10:
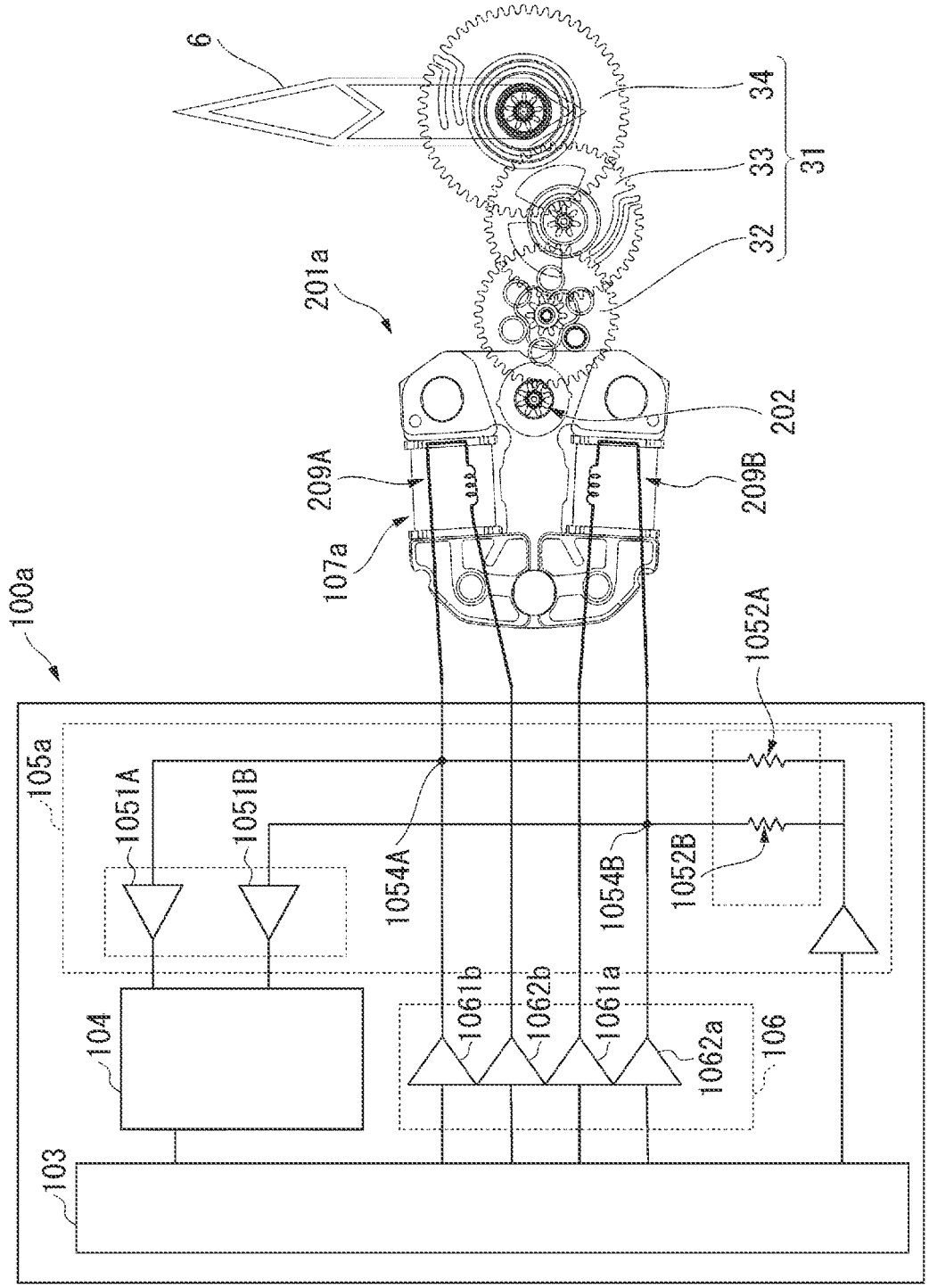
FIG. 10 is a diagram showing an example of a specific configuration of a stepping motor control device according to a modification.

FIG. 10 is a diagram showing an example of a specific configuration of the stepping motor control device according to the modification. A stepping motor control device 100a of the present modification includes a voltage detection circuit 105a.

The voltage detection circuit 105a is configured to detect the voltages at two points, the first voltage detection point 5054A and the second voltage detection point 5054B. More specifically, the voltage detection circuit 105a includes a first comparator 1051A and a first voltage detection resistor 1052A, and detects a voltage at the first voltage detection point 1054A. The voltage detection circuit 105a includes a second comparator 1051B and a second voltage detection resistor 1052B, and detects a voltage at the second voltage detection point 1054B.

That is, the voltage detection circuit 105a is capable of detecting the voltages at the two ends of the coil 209A and the voltages at the two ends of the coil 209B by two comparators.

According to the stepping motor control device 100 configured in this way, the circuit configuration of the voltage detection circuit 105 can be further simplified.

In the case of the two-coil motor, the induced voltage generated due to the load fluctuation of the load tooth 62 can be detected only when the rotor is rotating in the forward direction (or only when the rotor is rotating in the reverse direction). In such a configuration, even in the case of the two coil motor, if one comparator for detecting the induced voltage exists, the induced voltage generated due to the load fluctuation of the load tooth 62 can be detected.

According to the stepping motor control device 100 configured in this way, the circuit configuration of the voltage detection circuit 105 can be further simplified.

Second Embodiment

A second embodiment will be described. Descriptions of the same configuration and function as those of the first embodiment will be omitted.

Figure 11:
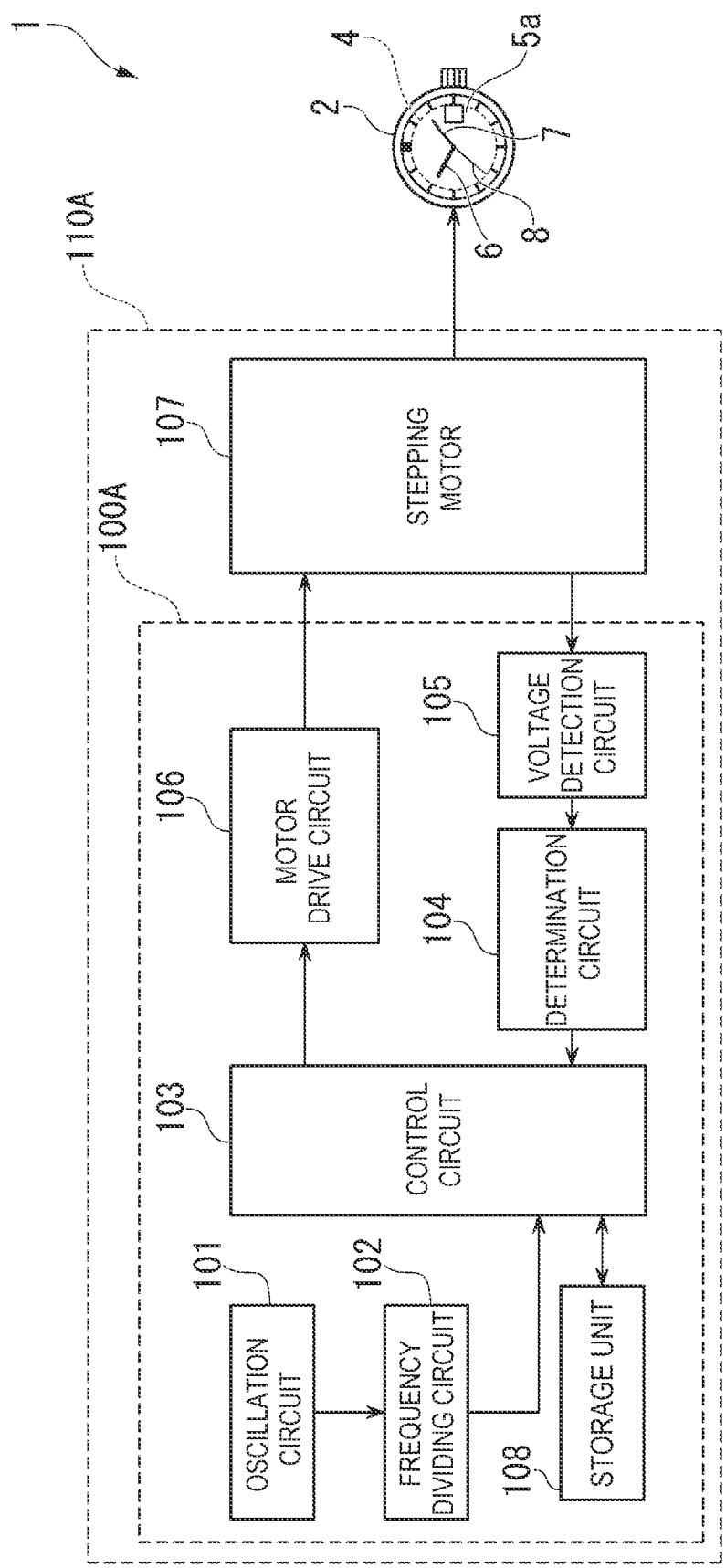
FIG. 11 is a diagram showing an example of a functional configuration of a timepiece according to a second embodiment.

FIG. 11 is a diagram showing an example of a functional configuration of a timepiece according to the second embodiment. A timepiece 1 of the present embodiment includes a hand drive unit 110A and a stepping motor control device 100A. The stepping motor control device 100A is different from the stepping motor control device 100 in that the stepping motor control device 100A includes a storage unit 108 in addition to the functional units of the stepping motor control device 100 described above.

The stepping motor control device 100A of the present embodiment has an interpolation function for a load detection result.

Based on the control of the control circuit 103, the storage unit 108 stores the detection result of the induced voltage detected by the voltage detection circuit 105 in association with the number of the steps of the rotor 22.

[Interpolation Function for Load Detection Result]

Figure 12:
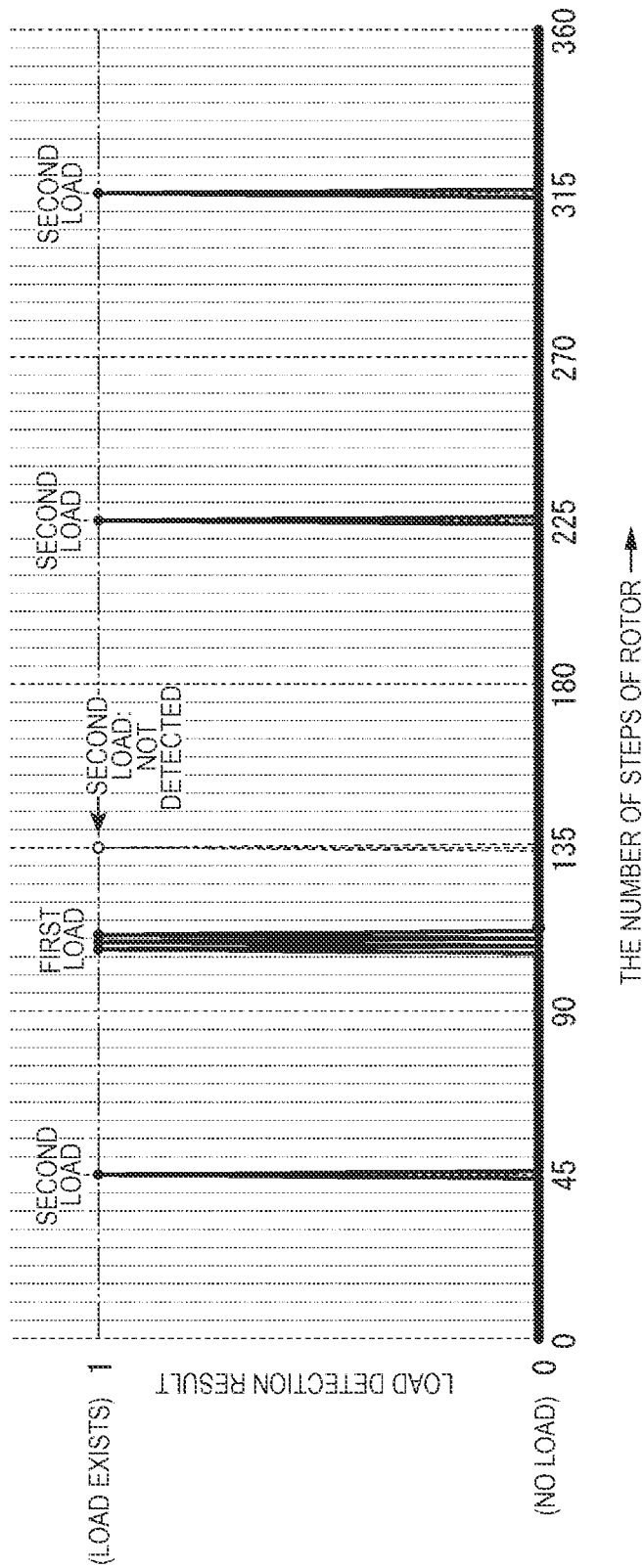
FIG. 12 is a diagram showing an example of a load detection result according to the present embodiment.

FIG. 12 is a diagram showing an example of the load detection result according to the present embodiment. The hour train wheel 31 described above will be described as an example.

In the hour train wheel 31, the second wheel 33 and the third wheel 32 each have a load tooth. In the following description, the load fluctuation due to the load tooth of the third wheel 32 is also referred to as a first load, and the load fluctuation due to the load tooth of the second wheel 33 is also referred to as a second load.

The hour train wheel 31 has a gear ratio described in the first embodiment. In the case of the hour train wheel 31 with the gear ratio described above, when the rotor 22 rotates 360 steps, the first wheel 34 makes one rotation. When the rotor 22 rotates 45 steps, the second wheel 33 makes one rotation.

As described above, in the second wheel 33, one of the teeth of the second wheel gear 33a is a load tooth. In the first wheel 34, one of the teeth of the first wheel gear 34a is a load tooth. Therefore, the first load is generated once for every one rotation of the first wheel 34. The second load is generated once for every one rotation of the second wheel 33.

In the case of the hour train wheel 31 with the gear ratio described above, the first wheel 34 has a smaller rotational angular velocity than that of the second wheel 33. Therefore, a time width of the first load generated due to the first wheel 34 is larger than a time width of the second load generated due to the second wheel 33. That is, the first load generated due to the first wheel 34 is generated for a longer time than the second load generated due to the second wheel 33.

Therefore, the control circuit 103 can determine whether a load is the first load or the second load based on the difference in the width of occurrence of the load fluctuation. The control circuit 103 can acquire the rotational position of the hand (for example, the hour hand 6) by combining the timing of generating the first load and the timing of generating the second load.

Here, if the induced voltage generated due to the load tooth of the second wheel 33 is less than the determination threshold voltage of the voltage detection circuit 105 or the like, when the voltage detection circuit 105 cannot detect the load fluctuation, the control circuit 103 may not be capable of knowing the rotational position of the hand (for example, the hour hand 6).

The control circuit 103 of the present embodiment stores, in the storage unit 108, the generation timing of the second load detected by the voltage detection circuit 105 in association with the number of the steps of the rotor 22.

As described above, the second load is generated every one rotation of the second wheel 33. That is, as shown in FIG. 12, the second load is generated every 90 steps of the rotor 22.

In this example, the second load generated when the number of the steps of the rotor 22 is "45", "225", and "315" can be detected, and the second load is generated when the number of the steps of the rotor 22 is "135" cannot be detected.

When the generation of the second load is detected when the number of the steps of the rotor 22 is "45", the control circuit 103 stores, in the storage unit 108, the detection result of the second load in association with the "45" steps of the rotor 22.

Next, in response to detecting the generation of the first load when the number of the steps of the rotor 22 is around "107" to "111", a position where the second load at the "45" steps of the rotor 22 is generated is determined as a reference position of the hand, and the step number of the current hand position is calculated from the reference position and stored in the storage unit 108.

Meanwhile, when the generation of the second load is not detected in the "135" steps of the rotor 22, the control circuit 103 does not store the detection result in the storage unit 108.

In response to detecting the generation of the second load when the number of the steps of the rotor 22 is "225", the control circuit 103 stores, in the storage unit 108, the detection result of the second load in association with the "225" steps of the rotor 22. Further, when the number of the steps of the rotor 22 is "135", although the induced voltage of the second load falls below the threshold for some reason, the detection result is interpolated assuming that the second load has been generated, and it is determined that no hand shifting is present. If the number of the steps of the rotor 22 is other than "225", for example, is "226" or "224", the generation of the second load is detected, and it is determined that the hand position is shifted due to an external impact at some timing at the number of steps more than "45" steps, and the number of steps from the reference position to the current hand position is corrected.

That is, the determination circuit 104 (the determination unit) of the present embodiment determines the timing at which the induced voltage is required to be detected by interpolating the result detected by the voltage detection circuit 105 (the voltage detection unit) based on a detection cycle of the induced voltage detected in the past.

Therefore, according to the stepping motor control device 100A, the control circuit 103 can know the rotational position of the hand (for example, the hour hand 6) even when the generation of the second load cannot be temporarily detected.

According to the stepping motor control device 100A configured in this way, it is unnecessary to detect the generation of the second load by a complicated circuit configuration, and the configuration of the detection circuit for the hand position can be simplified.

In the present embodiment, the control circuit 103 is described to perform the interpolation operation on the load detection result, but the invention is not limited thereto. For example, the determination circuit 104 may be configured to perform an interpolation operation on the load detection result.

In the present embodiment, the train wheel (the hour train wheel 31) driven by the stepping motor control device 100A has the gear ratio described in the first embodiment, but the invention is not limited thereto.

For example, the train wheel driven by the stepping motor control device 100A may have the gear ratio described as the comparative example in the first embodiment described above.

In the present embodiment, the first wheel 34, the second wheel 33, and the third wheel 32 are described with examples of a center wheel and pinion, a third wheel and pinion, and a seconds wheel and pinion, respectively, and other configurations of the train wheel may be used. For example, when the train wheel is configured with a fifth wheel and pinion, the seconds wheel and pinion, the third wheel and pinion, and the center wheel and pinion in order from the rotor in which the second hand and the minute hand are linked, the center wheel and pinion may include the first load, and the seconds wheel and pinion may include the second load. When the train wheel is configured with an intermediate wheel A, an intermediate wheel B, and the center wheel and pinion (an hour wheel when an hour hand is used) in order from the rotor with independent minute hand and hour hand, the center wheel and pinion (the hour wheel) may have the first load and the intermediate wheel B may have the second load.

The control circuit 103 may be given a detection cycle of the second load in advance, or may be configured to obtain the detection cycle from a history of the detection results of the second load in the past.

All or a part of the functions of the timepiece 1 described above are recorded as a program on a computer-readable recording medium, and the program may be executed by a computer system. The computer system includes hardware such as an OS and peripheral devices. The computer-readable recording medium is, for example, a portable medium such as a flexible disk, a magneto-optical disk, a read only memory (ROM), or a CD-ROM, a storage device such as a hard disk built in a computer system, or a volatile memory (random access memory: RAM) provided in a server or the like on a network such as the Internet. The volatile memory is an example of a recording medium that holds a program for a while.

The program described above may be transmitted to another computer system by a transmission medium or a communication line such as a network such as the Internet or a telephone line.

The program described above may be a program that implements all or the part of the above-mentioned functions. The program that implements all or the part of the above-mentioned functions may be a program that can implement the above-mentioned functions in combination with a program recorded in advance in the computer system, that is, a difference program.

Although the embodiments of the inventions are described with reference to the drawings, the specific configuration is not limited to the embodiments described above, and a design change or the like is included without departing from the gist of the invention.

What is claimed is:

1. A stepping motor control device comprising:
   a drive circuit configured to drive a stepping motor including a rotor and a coil configured to generate a magnetic flux to rotate the rotor, wherein the coil has a first end and a second end, and the drive circuit includes a first drive circuit configured to supply a first current flowing from the first end of the coil to the second end thereof and a second drive circuit configured to supply a second current flowing from the second end of the coil to the first end thereof;
   a controller configured to output, to the drive circuit, a drive pulse to rotate the rotor stepwise at every 180-degree rotation interval and a swing pulse to swing the rotor to vibrate;

a train of wheel gears configured to transmit a rotation force from the rotor to a hand, the train of wheel gears including a load gear, wherein the load gear includes one load tooth whose rotation load is different from a rotation load of the other teeth of the load gear, and wherein the train of wheel gears is configured such that the rotor makes an odd number of rotation steps to make the load gear one full rotation;

a voltage detector connected only at the first end of the coil and configured to only detect an induced voltage of the coil appearing at the first end of the coil during vibration of the rotor, wherein the detected induced voltage changes upon transmission of the rotation force from the rotor to the hand through said one load tooth of the load gear; and a determination circuit responsive to a change of the detected induced voltage from the voltage detector to determine a rotational position of the load gear.

2. The stepping motor control device according to claim 1, wherein the train of wheel gears includes a first wheel gear that rotates at an angular velocity equal to an angular velocity of the hand, a second wheel gear comprised of the load gear and a pinion gear meshed with the first wheel gear, and a third wheel gear meshed with the rotor and comprised of a pinion gear meshed with the load gear of the second wheel.

3. The stepping motor control device according to claim 2, wherein the rotor makes an odd number of rotation steps to make the second wheel one full rotation.

4. The stepping motor control device according to claim 2, wherein the second wheel is chosen to have an odd number of teeth.

5. The stepping motor control device according to claim 2, wherein the first wheel gear has one load tooth whose rotation load is different from a rotation load of the other teeth of the first wheel gear, and the determination circuit, responsive to a change of the detected induced voltage from the voltage detector, determines a rotational position of the load gear, wherein the detected induced voltage changes upon transmission of the rotation force from the rotor to the hand through said one load tooth of the first wheel gear.

6. The stepping motor control device according to claim 1, wherein the stepping motor includes the coil in plural, and the drive circuit provided for each of the coils.

7. The stepping motor control device according to claim 1, wherein the determination circuit is configured to determine a cycle at which the induced voltage is detected and further determine, based on the determined cycle, a timing at which the induced voltage is required to be detected.

8. A stepping motor control device, comprising:
a drive circuit configured to drive a stepping motor including a rotor and a coil configured to generate a magnetic flux to rotate the rotor, wherein the coil has a first end and a second end;
a controller configured to output, to the drive circuit, a drive pulse to rotate the rotor and a swing pulse to swing the rotor to vibrate;
a train of wheel gears configured to transmit a rotation force from the rotor to a hand, the train of wheel gears including a load gear, wherein the gear teeth include one load tooth whose rotation load is different from a rotation load of the other teeth of the load gear, and wherein the train of wheel gears is configured such that the rotor makes an odd number of rotation steps to make the load gear one full rotation;

a voltage detector connected only at the first end of the coil and configured to only detect an induced voltage of the coil appearing at the first end of the coil during vibration of the rotor; and a determination circuit responsive to a change of the detected induced voltage from the voltage detector to determine a rotational position of the load gear, wherein the detected induced voltage changes upon transmission of the rotation force from the rotor to the hand through said one load tooth of the load gear, and further wherein the determination circuit is configured to determine a cycle at which the detected induced voltage changes and further determine, based on the determined cycle, a timing at which the mechanical load is required to be detected.

9. A movement, comprising the stepping motor control device according to claim 1; and the stepping motor.

10. A timepiece, comprising the movement according to claim 9.

11. A movement, comprising the stepping motor control device according to claim 8; and the stepping motor.

12. A timepiece, comprising the movement according to claim 11.

13. A stepping motor control method, comprising:
outputting, to a drive circuit, a drive pulse to rotate a rotor stepwise at every 180-degree rotation interval and a swing pulse to swing the rotor to vibrate, the drive circuit configured to drive a stepping motor including the rotor and a coil configured to generate a magnetic flux to rotate the rotor, wherein the coil has a first end and second end, and the drive circuit includes a first drive circuit configured to supply a first current flowing from the first end of the coil to the second end thereof and a second drive circuit configured to supply a second current flowing from the second end of the coil to the first end thereof;
transmitting a rotation force from the rotor to a hand through a train of wheel gears including a load gear, wherein the load gear includes one load tooth whose rotation load is different from a rotation force of the other teeth of the load gear, and wherein the train of wheel gears is configured such that the rotor makes an odd number of rotation steps to make the load gear one full rotation;
only detecting an induced voltage of the coil appearing at the first end of the coil during vibration of the rotor, wherein the detected induced voltage changes upon transmission of the rotation force from the rotor to the hand through said one load tooth of the load gear; and
responsive to a change of the detected induced voltage, determining a rotational position of the load gear.

14. A stepping motor control method, comprising:
outputting, to a drive circuit, a drive pulse to rotate a rotor and a swing pulse to swing the rotor to vibrate, the drive circuit configured to drive a stepping motor including the rotor and a coil configured to generate a magnetic flux to rotate the rotor, wherein the coil has a first end and second end;
transmitting a rotation force from the rotor to a hand through a train of wheel gears including a load gear, wherein the load gear includes one load tooth whose rotation load is different from a rotation force of the other teeth of the load gear, and wherein the train of wheel gears is configured such that the rotor makes an odd number of rotation steps to make the load gear one full rotation;

only detecting an induced voltage of the coil appearing at the first end of the coil during vibration of the rotor, wherein the detected induced voltage changes upon transmission of the rotation force from the rotor to the hand through said one load tooth of the load gear;

responsive to a change of the detected induced voltage, determining a rotational position of the load gear; and determining a cycle at which the detected induced voltage changes and further determining a timing at which the mechanical load is required to be detected.

15. The stepping motor control device according to claim 5, wherein the determination circuit is configured to respectively determine a first load which is a mechanical load received by the rotor due to contact of the pinion gear of the second wheel gear with the load tooth of the first wheel gear, and a second load which is a mechanical load received by the rotor due to contact of the pinion gear of the third wheel gear with the load tooth of the second wheel gear.

\* \* \* \* \*